(12) United States Patent
Inata et al.

(10) Patent No.: US 7,853,965 B2
(45) Date of Patent: Dec. 14, 2010

(54) DISK DRIVE

(75) Inventors: Masahiro Inata, Hyogo (JP); Teruyuki Takizawa, Osaka (JP); Kozo Ezawa, Osaka (JP)

(73) Assignee: Panasonic Corporation, Osaka (JP)

( * ) Notice: Subject to any disclaimer, the term of this patent is extended or adjusted under 35 U.S.C. 154(b) by 547 days.

(21) Appl. No.: 12/016,358

(22) Filed: Jan. 18, 2008

(65) Prior Publication Data

US 2008/0178205 A1 Jul. 24, 2008

(30) Foreign Application Priority Data

Jan. 22, 2007 (JP) ............... 2007-011002

(51) Int. Cl.
*G11B 17/03* (2006.01)
(52) U.S. Cl. .................................... 720/640
(58) Field of Classification Search ............... 720/640, 720/612, 639, 643, 713, 634, 601, 647, 740, 720/641, 616
See application file for complete search history.

(56) References Cited

U.S. PATENT DOCUMENTS

| 7,538,459 B2 * | 5/2009 | Ichizaki .................... 310/67 R |
| 2005/0246729 A1 * | 11/2005 | Omori et al. ................ 720/675 |
| 2008/0179978 A1 * | 7/2008 | Ichizaki ....................... 310/89 |
| 2009/0096303 A1 * | 4/2009 | Takaki et al. .............. 310/90.5 |
| 2009/0199225 A1 * | 8/2009 | Inata et al. .................. 720/641 |
| 2009/0235294 A1 * | 9/2009 | Ezawa et al. ................ 720/740 |
| 2010/0050195 A1 * | 2/2010 | Inata et al. .................. 720/647 |

FOREIGN PATENT DOCUMENTS

| JP | 09-153264 | 6/1997 |
| WO | 2007/126144 | 11/2007 |

OTHER PUBLICATIONS

Co-pending U.S. Appl. No. 11/872,074, filed Oct. 15, 2007 (application attached).

* cited by examiner

*Primary Examiner*—Allen T Cao
(74) *Attorney, Agent, or Firm*—Renner, Otto, Boisselle & Sklar, LLP

(57) ABSTRACT

A disk drive includes: a cartridge holder that holds a disk cartridge including a disk, and has a holder opening, through which the cartridge is inserted and ejected; two guide walls arranged near the holder opening to define a direction in which the cartridge is inserted; a disk motor for rotating the disk mounted; a head for reading and/or writing information from/on the disk; a base for supporting the head and motor; first and second guide grooves cut through the holder; and first and second guide members movable along the first and second grooves, respectively, and engaging with respective portions of the cartridge. The first and second guide members move along the first and second grooves, respectively, and engage with the cartridge so as to leave a gap narrower than a gap between the walls when the cartridge is inserted but to leave a gap broader than the gap between the walls when the drive gets loaded with the cartridge, thereby opening a window in the cartridge so as to allow the head to access the disk and allow the disk motor to mount the disk.

12 Claims, 17 Drawing Sheets

DISK DRIVE

BACKGROUND OF THE INVENTION

1. Field of the Invention

The present invention relates to a disk drive for reading and/or writing data from/on a disklike data storage medium such as an optical disk or a magnetic disk that is housed in a disk cartridge.

2. Description of the Related Art

Various disklike read-only or rewritable storage media, including optical disks such as a CDs and DVDs to read and write data using a light beam, magnetic disks such as flexible disks to read and write data using magnetism, and magneto-optical disks such as MOs and MDs to read and write data using a light beam and magnetism in combination, have already been used extensively around the world. Among other things, DVD-RAMs, MOs and other recordable media are housed in a cartridge such as that disclosed in Japanese Patent Application Laid-Open Publication No. 9-153264 (hereinafter, Patent Document No. 1) in order to protect the data stored there. As used herein, a "disk cartridge" refers to a cartridge in which such a disklike read-only or rewritable storage medium is housed.

FIG. 17 schematically illustrates the structure of the disk cartridge that is disclosed in Patent Document No. 1. As shown in FIG. 17, the disk cartridge 100 includes a supporting base portion 101 that houses a read-only or rewritable disk 10 and that forms the outer shell of the disk cartridge 100.

The supporting base portion 101 has a window 101w on the upper and lower surfaces thereof to allow some means for rotating the disk 10 (such as a disk motor) and a read/write means to enter the supporting base portion 101 and access the disk 10.

The supporting base portion 101 also has inner walls for holding the disk 10 rotatably with the center of the disk 10 positioned and with some clearance left with respect to the disk 10.

The disk cartridge 100 includes a shutter 103 that has been folded in a C-shape to close the window 101w on the upper and lower surfaces of the supporting base portion 101 and to protect the data side of the disk 10 to be exposed inside the window 101w.

The shutter 103 can move parallel in the direction indicated by the arrow T in FIG. 17 and is biased by a spring so as to keep the window 101w closed unless some external force is applied thereto. Thus, this disk cartridge 100 is designed so as not to expose the disk 10 unless the external force is applied.

To perform a read/write operation on this disk cartridge 100 using a disk drive (not shown), the shutter 103 of the cartridge is moved in the direction indicated by the arrow T and the disk 10 is exposed in order to clamp the disk 10 and to allow a read/write means to access the disk 10. In this case, as the disk cartridge 100 being inserted into the disk drive goes in the direction indicated by the arrow Q, the notched portion 103a of the shutter 103 gets engaged with the protrusion 104a of a shutter opener 104 and the shutter opener 104 is turned around the center of rotation 104b in the direction indicated by the arrow R, thereby sliding the shutter in the direction indicated by the arrow T.

As in the disk cartridge disclosed in Patent Document No. 1, to get the disk chucked and to allow the optical head to access the entire data side of the disk, the conventional disk cartridge needs to have a window that runs from the center of the cartridge through its end. Also, in a disk cartridge with such a structure, the shutter moves straight with respect to the shell of the cartridge, thus requiring a space to store the shutter opened. That is why the size of the window depends on the overall size of the cartridge, and therefore, it is difficult to design a small cartridge with a big window. As a result, in small portable devices and disk video cameras in which a small cartridge is used, the size of the optical head is limited.

In order to overcome the problems described above, the present invention has an object of providing a disk drive that is specially designed for a disk cartridge that can have a big head access window even though its overall size is small.

SUMMARY OF THE INVENTION

A disk drive according to the present invention can be loaded with a disk cartridge that houses a disk therein. The drive includes: a cartridge holder for holding the disk cartridge, the holder having a holder opening, through which the disk cartridge is inserted from outside of the drive into the cartridge holder and ejected out of the cartridge holder; a pair of guide walls, which is arranged in the vicinity of the holder opening of the cartridge holder to define a direction in which the disk cartridge is supposed to be inserted; a disk motor for rotating the disk that has been mounted thereon; a head for reading and/or writing information from/on the disk; a base for supporting the head and the disk motor thereon; first and second guide grooves, which have been cut through the cartridge holder; and first and second guide members, which are movable along the first and second guide grooves, respectively, and which engage with respective portions of the disk cartridge. The first and second guide members move along the first and second guide grooves, respectively, and engage with the disk cartridge so as to leave a gap that is narrower than a gap between the guide walls when the disk cartridge is inserted but to leave a gap that is broader than the gap between the guide walls when the drive gets loaded with the disk cartridge, thereby opening a window in the disk cartridge so as to allow the head to access the disk and also allow the disk motor to mount the disk.

In one preferred embodiment of the present invention, in the cartridge holder, the first and second guide grooves are arranged symmetrically to each other with respect to a plane that is defined parallel to the direction in which the disk cartridge is inserted or ejected and that includes the axis of rotation of the disk.

In this particular preferred embodiment, at least one of the first and second guide grooves is partially defined by a guide face that intersects at right angles with the direction in which the disk cartridge is inserted or ejected.

In a specific preferred embodiment, positions where the first and second guide members start engaging with the disk cartridge being inserted are closer to the holder opening than their positions when the drive is loaded with the disk cartridge.

In another preferred embodiment, the disk cartridge includes: first and second disk storage portions, each of which has a space to house the disk partially and which house the disk entirely when joined together; and a supporting base member for supporting the first and second disk storage portions so as to allow the first and second disk storage portions to turn around their respective pivots. The first and second guide members interlock with the first and second disk storage portions, respectively, thereby turning the first and the second disk storage portions so as to open a window in the disk cartridge being inserted.

In this particular preferred embodiment, each of the first and second disk storage portions of the disk cartridge includes: a notch, with which an associated one of the first and second guide members engages rotatably; and an engaging portion. The engaging portions of the first and second disk storage portions engage with each other such that the first and second disk storage portions turn around the pivots in mutually opposite directions synchronously with each other.

In a specific preferred embodiment, a first link mechanism is formed by the first guide member that moves along the first guide groove when the disk cartridge is inserted or ejected, the notch of the first disk storage portion with which the first guide member engages rotatably, the first disk storage portion, and the pivot of the first disk storage portion. A second link mechanism is formed by the second guide member that moves along the second guide groove when the disk cartridge is inserted or ejected, the notch of the second disk storage portion with which the second guide member engages rotatably, the second disk storage portion, and the pivot of the second disk storage portion. As the first and second disk storage portions turn around their pivots in mutually opposite directions synchronously with each other, the first and second link mechanisms get the disk cartridge inserted in the right direction, thereby positioning the disk cartridge being inserted or ejected just as intended.

In a more specific preferred embodiment, the pair of guide walls is arranged only in the vicinity of the holder opening.

More specifically, the disk drive preferably further includes a positioning portion to contact with the outer edge of the disk when the disk cartridge is loaded. The positioning portion and the disk contact with each other, thereby positioning the center of the disk with respect to the disk motor.

In that case, the positioning portion may form part of the cartridge holder.

In an alternative preferred embodiment, the positioning portion may also form part of the base.

In another preferred embodiment, the first and second guide members have a guide face that contacts with the bottom of the first and second disk storage portions while the disk cartridge is being inserted or ejected.

In yet another preferred embodiment, the disk drive further includes a biasing structure for biasing the first and second guide members so as to narrow the gap between the first and second guide members.

In this particular preferred embodiment, the biasing structure includes: first and second biasing levers, which engage with the first and second guide members, respectively, and which are supported by the cartridge holder so as to turn around their respective pivots; and elastic bodies for biasing the first and second biasing levers such that the first and second guide members narrow their gap.

In a specific preferred embodiment, each of the first and second guide members includes: a base portion that has a bearing surface to contact with a surface of the cartridge holder with the first and second guide grooves; a guide groove projection, which is arranged on the base portion and which is inserted into the first or second guide groove; and a cartridge projection, which is also arranged on the base portion, protrudes in the opposite direction to the guide groove projection, and engages with the notch of the first or second disk storage portion.

In a more specific preferred embodiment, the first and second biasing levers have engaging grooves, into which the cartridge projections of the first and second guide members are fitted. The first and second biasing levers and the first and second guide members are arranged on the cartridge holder such that the base portions of the first and second guide members are interposed between the cartridge holder and the first and second biasing levers.

More specifically, when the disk drive is loaded with the disk cartridge, the pivots of the first and second biasing levers are located outside of the projection area of the disk cartridge that is defined perpendicularly to the axis of rotation of the disk.

In an alternative preferred embodiment, the cartridge holder is movable with respect to the base so as to be located at either a first position where the disk cartridge can be inserted into, or ejected out of, the cartridge holder without interfering with the disk motor or the head or a second position where the disk in the disk cartridge that is held by the cartridge holder can be mounted on the disk motor to allow the head to access the disk.

In this particular preferred embodiment, the supporting base has first and second guide member positioning holes, into which the guide groove projections of the first and second guide members fit, respectively, when the cartridge holder is located at the second position where the disk cartridge has already been inserted into the cartridge holder.

In an alternative preferred embodiment, the supporting base has first and second guide member regulating holes, into which the guide groove projections of the first and second guide members fit, respectively, when the cartridge holder is located at the first position where the disk cartridge has not been inserted into the cartridge holder yet.

In this particular preferred embodiment, the first and second guide grooves have spaces that allow the first and second guide members, which are respectively engaged with the notches of the first and second disk storage portions of the disk cartridge, to go parallel to the direction in which the disk cartridge is inserted or ejected.

When a disk cartridge is inserted into the disk drive of the present invention, the gap between the first and second guide members is narrower than the gap between the pair of guide walls. That is why the first and second guide members can contact and engage firmly with the disk cartridge being inserted. In addition, the first and second guide members move along the first and second guide grooves such that the gap between the first and second guide members will become broader than the gap between the pair of guide walls when the disk drive has been loaded with the disk cartridge. For that reason, when the disk housing is opened, a big window can be made with the shutter and housing portions sticking out of the projection area of the disk cartridge when the disk housing is closed. Consequently, this disk drive is compatible with a disk cartridge that has a big head access window for its small overall size.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

The applicant of the present application proposed a disk cartridge that has a small overall size but can still have a big head access window in PCT International Application PCT/JP2007/059444, which has not been laid open yet. The disk drive of the present invention is compatible with such a disk cartridge. Hereinafter, the structure of that disk cartridge will be described.

Figure 12A:
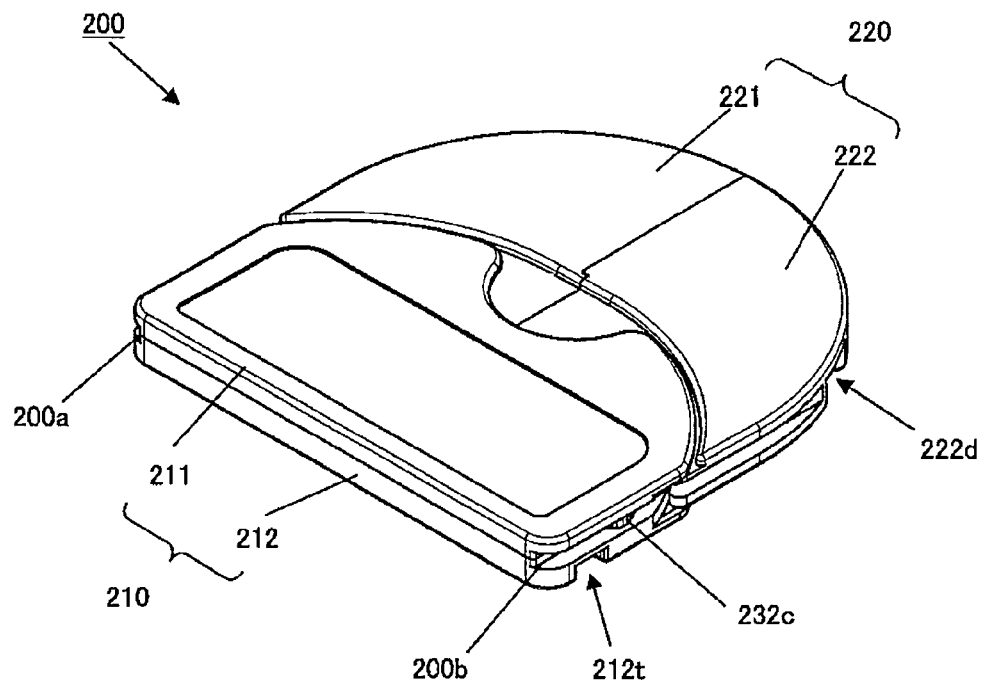
FIGS. 12A and 12B are perspective views illustrating the general appearance of a disk cartridge that opens and closes a window by turning its disk storage portions in two opposite directions in a situation where the disk storage portions are closed and in a situation where the disk storage portions are opened, respectively.
Figure 12B:
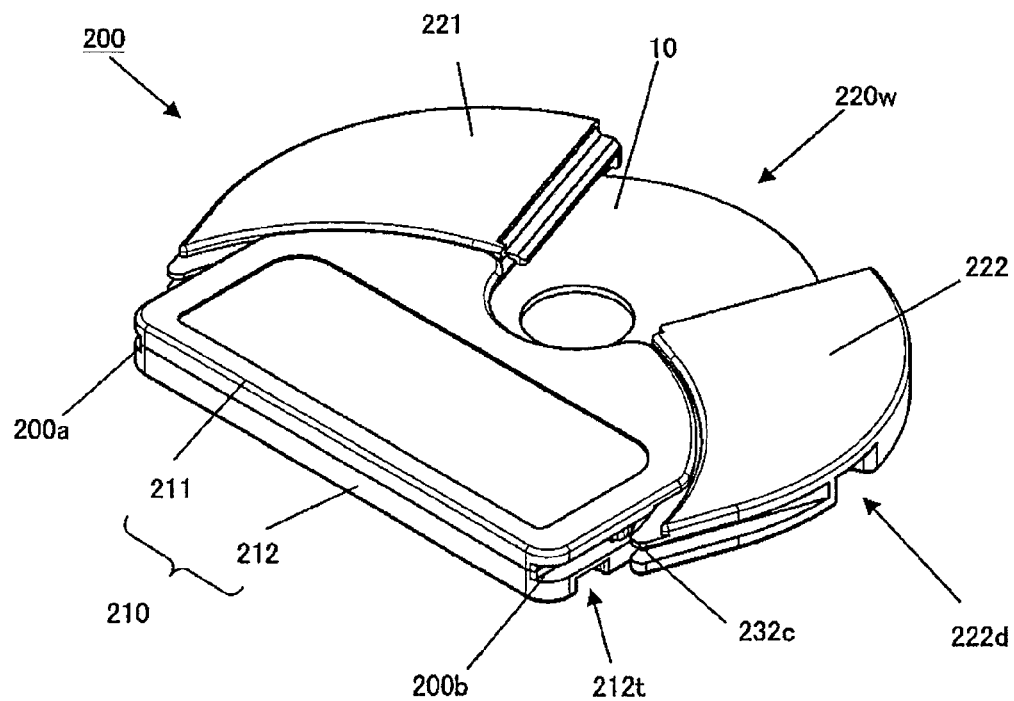
Figure 13A:
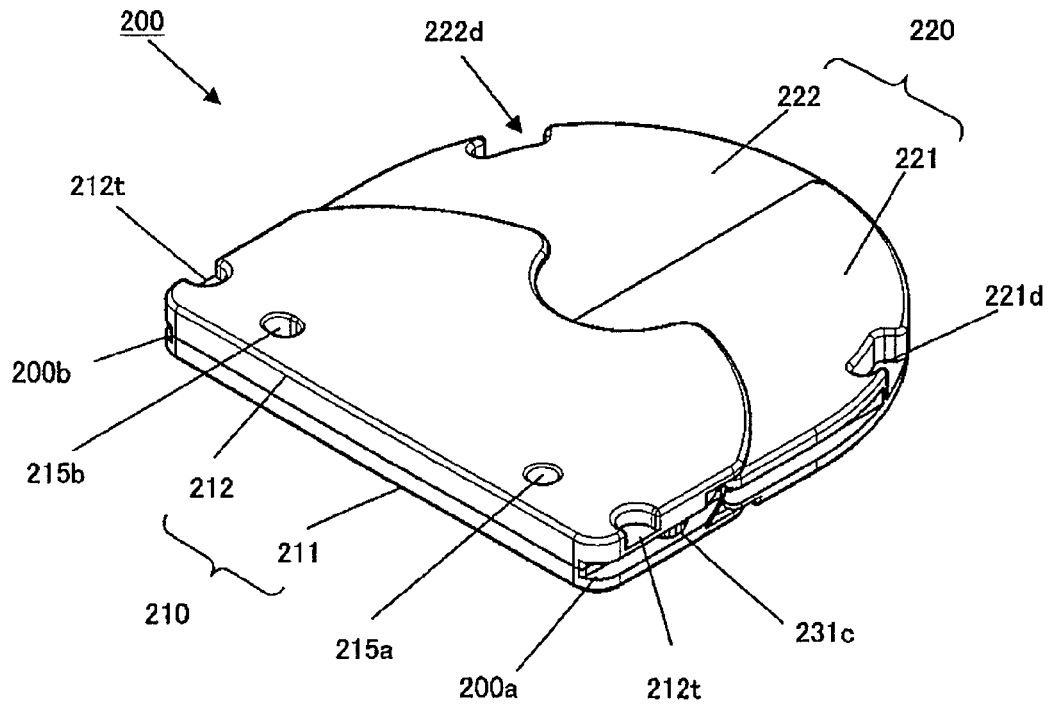
FIGS. 13A and 13B are perspective views illustrating the general appearance of the bottom of the disk cartridge that opens and closes a window by turning its disk storage portions in two opposite directions in a situation where the disk storage portions are closed and in a situation where the disk storage portions are opened, respectively.
Figure 13B:
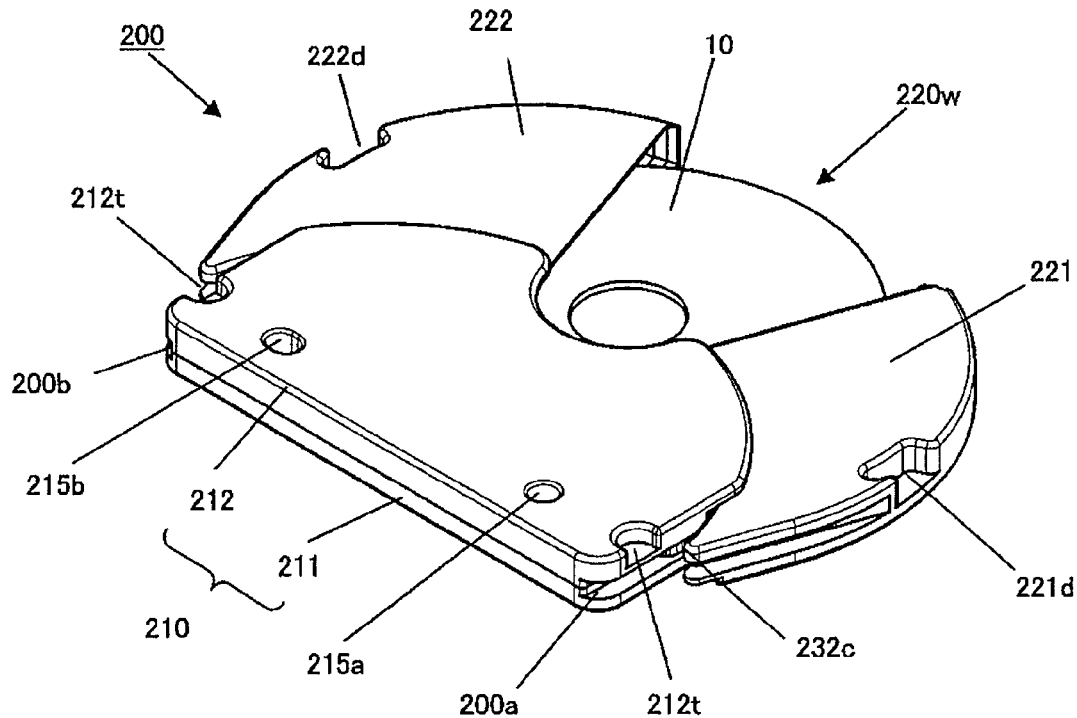
Figure 14:
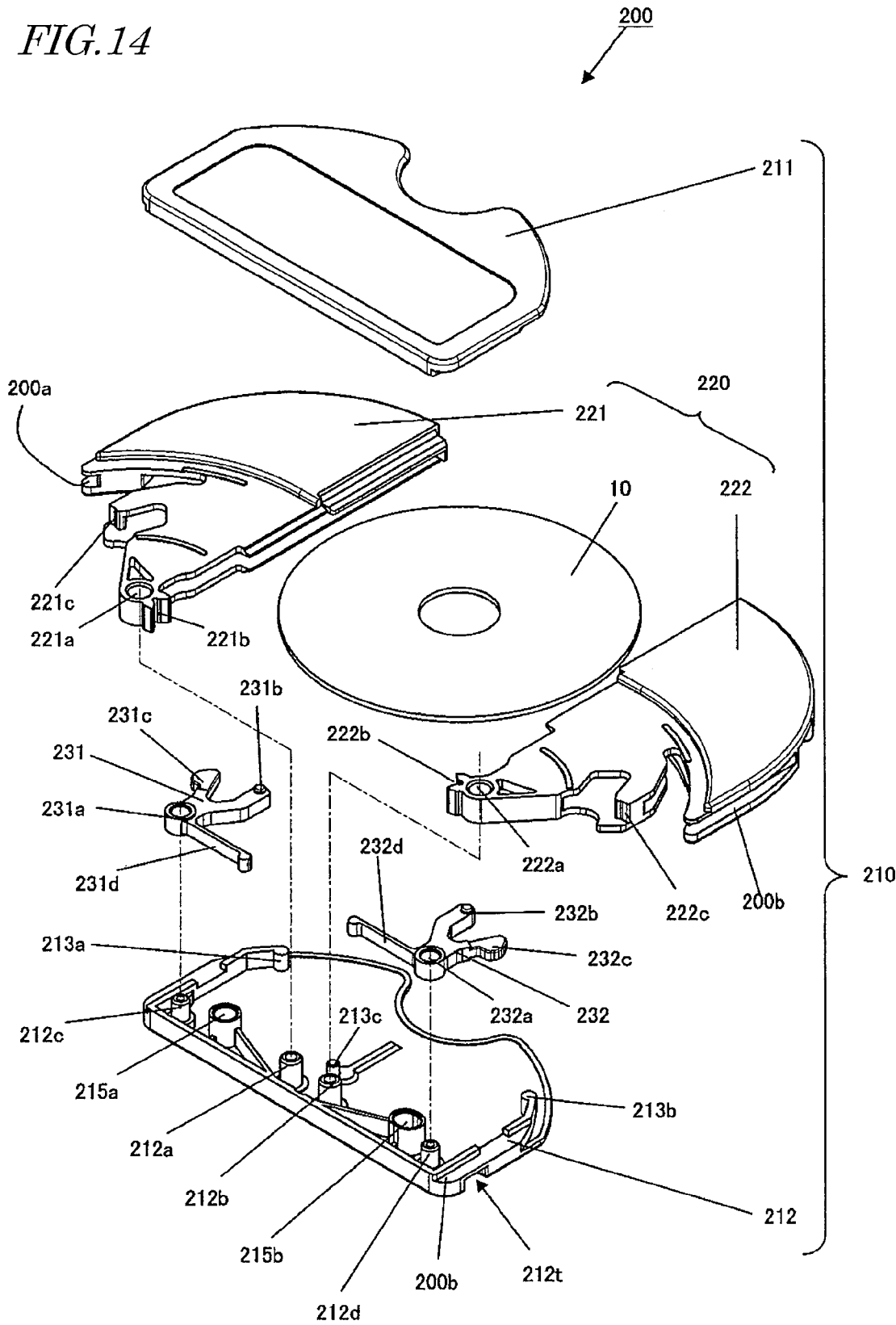
FIG. 14 is an exploded perspective view illustrating the structure of such a disk cartridge that opens and closes a window by turning its disk storage portions in two opposite directions.

FIGS. 12A and 12B are perspective views illustrating the general appearance of a disk cartridge 200 that can be loaded into the disk drive of the present invention as viewed from above the upper side thereof. Specifically, FIG. 12A illustrates how the disk cartridge 200 looks when its window is closed, and FIG. 12B illustrates how the disk cartridge 200 looks when the window is opened to partially expose a disk 10 inside the cartridge 200. On the other hand, FIGS. 13A and 13B are perspective views illustrating the general appearance of the disk cartridge 200 as viewed from above the lower side thereof. Specifically, FIG. 13A illustrates how the disk cartridge 200 looks when its window is closed, and FIG. 13B illustrates how the disk cartridge 200 looks when the window is opened to partially expose the disk 10 inside the cartridge 200. And FIG. 14 is an exploded perspective view illustrating respective members that form the disk cartridge 200.

The disk cartridge 200 includes a first disk storage portion 221, a second disk storage portion 222 and a supporting base member 210.

The first and second disk storage portions 221 and 222 each have a space to house a portion of the disk 10 and form a disk housing 220 to house the disk 10 in its entirety when joined together. More specifically, each of the first and second disk storage portions 221 and 222 has a flat baglike space to house a portion of the disk 10. And by merging the first and second disk storage portions 221 and 222 together with the edges of their openings fitted into each other, a space to house the entire disk 10 is produced. In the following description, the first and second disk storage portions 221 and 222 will sometimes be referred to herein as a "disk housing 220" collectively.

The supporting base member 210 supports the first and second disk storage portions 221 and 222 thereon such that these housing portions 221 and 222 can turn around their axes of rotation. At least a portion of the supporting base member 210 overlaps with the first and second disk storage portions 221 and 222 to prevent the first and second disk storage portions 221 and 222 to move perpendicularly to the disk 10.

As shown in FIGS. 12B and 13B, when the first and second disk storage portions 221 and 222 are opened, a substantially fan-shaped window 220*w* is made to allow a disk motor, clamper and other members for rotating the disk 10 and a read/write head to approach and access the disk 10 from outside of the disk cartridge 200.

Therefore, the first and second disk storage portions 221 and 222 function not only as a housing, or an outer shell for the disk cartridge 200, but also as shutters for opening and closing the window 220*w*.

As shown in FIGS. 12A and 13A, as viewed from over the upper or lower side of the disk cartridge 200, the disk cartridge 200 has an arc shape where the window 220*w* is supposed to be opened. That is why the first and second disk storage portions 221 and 222 also have a curved side surface where the window 220*w* is supposed to be opened.

The supporting base member 210 includes an upper supporting base portion 211 and a lower supporting base portion 212. As shown in FIG. 14, the lower supporting base portion 212 has positioning holes 215*a* and 215*b* to position the disk cartridge 200 on a plane that is parallel to the disk 10 in the disk drive (not shown). Also, the lower supporting base portion 212 has notches 212*t* on both sides thereof. These notches 212*t* may be used to prevent the user from loading the disk cartridge 200 upside down in a tray loading system or to engage with the disk cartridge 200 in a slot loading system, for example.

The first and second disk storage portions 221 and 222 have pivot holes 221*a* and 222*a*, respectively, into which pivots 212*a* and 212*b* on the lower supporting base portion 212 are respectively inserted, thereby supporting the first and second disk storage portions 221 and 222 rotatably such that these housing portions 221 and 222 can turn around the pivots 212*a* and 212*b*, respectively.

The first and second disk storage portions 221 and 222 further have engaging portions 221*b* and 222*b* that engage and interlock with each other. By interlocking these engaging portions 221*b* and 222*b* with each other, the first and second disk storage portions 221 and 222 can turn around their respective pivots 212*a* and 212*b* in mutually opposite directions and synchronously with each other.

Also, the first and second disk storage portions 221 and 222 have notches 221*d* and 222*d*, which can be used to open or close the first and second disk storage portions 221 and 222 externally.

A first locking member 231 and a second locking member 232 have pivot holes 231*a* and 232*a*, respectively, into which pivots 212*c* and 212*d* on the lower supporting base portion 212 are inserted, so as to be attached rotatably to the lower supporting base portion 212.

The first locking member 231 includes a catching lever portion 231*b* that catches the latching portion 221*c* of the first disk storage portion 221, thereby preventing the first disk storage portion 221 from turning in the opening direction while the first and second disk storage portions 221 and 222 are closed, an opener/closer 231*c* for operating the first locking member 231 externally, and an elastic portion 231*d* that deforms elastically under externally applied force.

Likewise, the second locking member 232 also includes a catching lever portion 232*b* that catches the latching portion 222*c* of the second disk storage portion 222, thereby preventing the second disk storage portion 222 from turning in the opening direction while the disk housing 220 is closed, an opener/closer 232*c* for operating the second locking member 232 externally, and an elastic portion 232*d* that deforms elastically under externally applied force.

Furthermore, the disk cartridge 200 has unlocking slits 200*a* and 200*b* for operating the first and second locking members 231 and 232 on the right- and left-hand sides thereof. The openers/closers 231*c* and 232*c* of the first and second locking members 231 and 232 are designed so as to protrude into the slits 200*a* and 200*b*, respectively, but not to stick out of the outer shell of the disk cartridge 200. Thus the person who handles the disk cartridge 200 cannot easily press the openers/closers 231*c* and 232*c* with his or her fingers. In this manner, it is possible to prevent the user from operating the locking members 231 and 232 intentionally and carelessly.

Figure 15A:
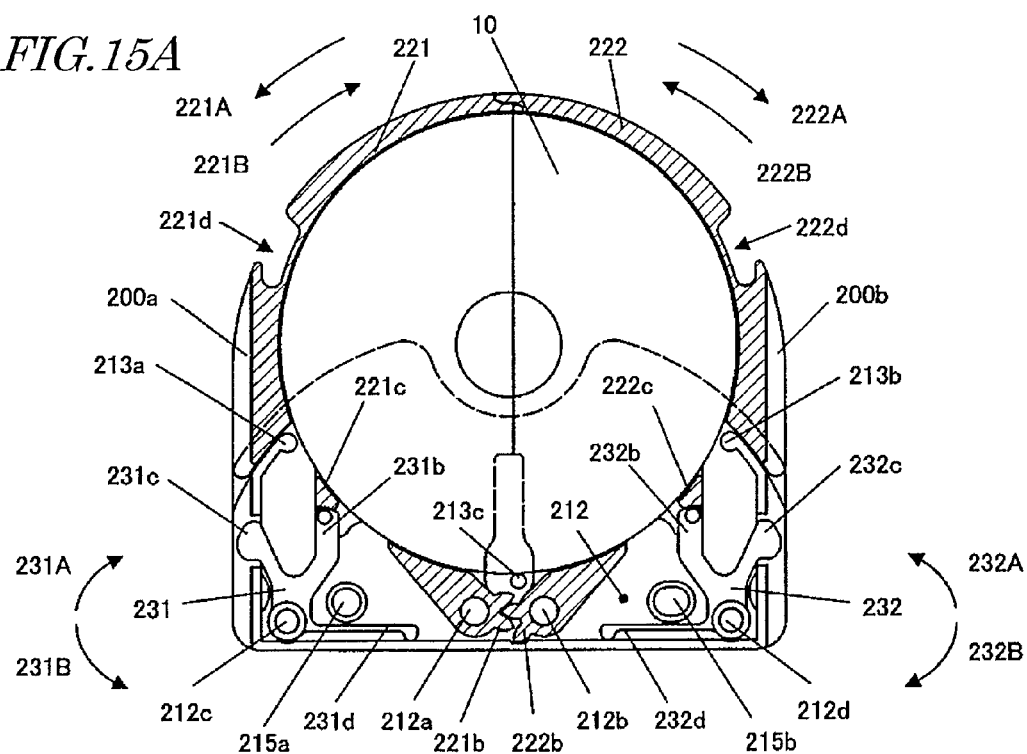
FIGS. 15A and 15B are partial cross-sectional views of the disk cartridge shown in FIG. 12 in a situation where the disk storage portions are closed and in a situation where the disk storage portions are opened, respectively.
Figure 15B:
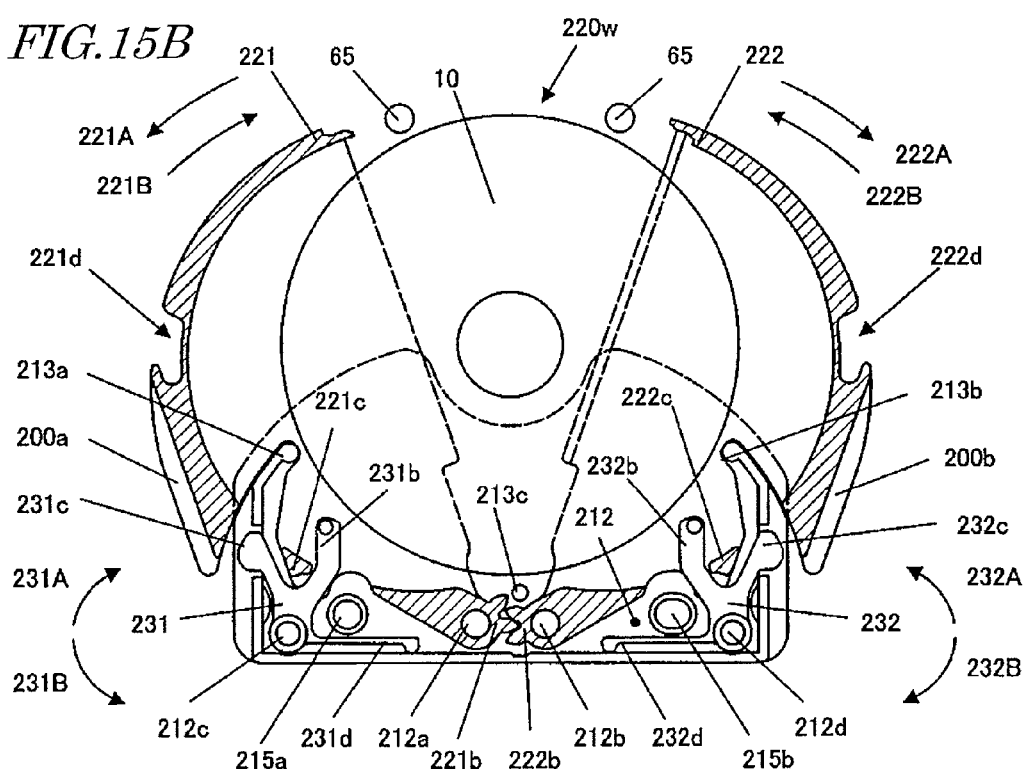

Hereinafter, it will be described exactly how to open or close the disk housing 220 of the disk cartridge 200. FIGS. 15A and 15B are partial cross-sectional views of the disk cartridge 200 in a situation where the first and second disk storage portions 221 and 222 are closed and a situation where the first and second disk storage portions 221 and 222 are opened, respectively.

As shown in FIG. 15A, while the first and second disk storage portions 221 and 222 are closed, the catching lever portions 231*b* and 232*b* of the first and second locking members 231 and 232 catch the latching portions 221*c* and 222*c* of the first and second disk storage portions 221 and 222, thereby stopping the first and second disk storage portions 221 and 222 from turning in the directions indicated by the arrows 221A and 222A, respectively. In this case, the elastic portions 231*d* and 232*d* are not deformed elastically. Also, to prevent the disk 10 from rattling inside the disk cartridge 200, the inner walls of the first and second disk storage portions 221 and 222 have portions that contact with the periphery or the outer edge of the disk 10 to hold the disk 10 firmly when the disk housing 220 is closed.

If the first and second locking members 231 and 232 are pressed down and unlocked at the same time in the state shown in FIG. 15A to let the first and second disk storage portions 221 and 222 turn in the directions indicated by the arrows 221A and 222A, respectively, the first and second disk storage portions 221 and 222 are opened as shown in FIG. 15B. In this state, the inner walls of the first and second disk storage portions 221 and 222 are out of contact with the disk 10 and therefore the disk 10 can now take any position with respect to the supporting base member 210 as far as the disk 10 keeps out of contact with the inner walls. That is why the position of the disk 10 is regulated with position regulating portions 213*a*, 213*b* and 213*c* on the lower supporting base portion 212 and positioning portions 65 provided for the disk drive.

To close the first and second disk storage portions 221 and 222, the first and second disk storage portions 221 and 222 are turned in opposite directions (i.e., in the directions indicated by the arrows 221B and 222B, respectively) compared to the opening operation. In the meantime, the first and second locking members 231 and 232 contact with the latching portions 221*c* and 222*c* of the first and second disk storage portions 221 and 222 to rotate in the directions 231A and 232A, respectively. And when the disk housing 220 is fully closed as shown in FIG. 15A, the first and second locking members 231 and 232 rotate in the directions indicated by the arrows 231B and 232B, respectively, under the elastic force applied by their elastic portions 231*d* and 232*d*. As a result, the catching lever portions 231*b* and 232*b* of the first and second locking members 231 and 232 catch the latching portions 221*c* and 222*c* of the first and second disk storage portions 221 and 222, respectively, thereby stopping the disk housing 220 from turning. In this manner, the operation of closing the first and second disk storage portions 221 and 222 can get done.

In the disk cartridge 200, the overall projection area of the disk 10, the first and second disk storage portions 221, 222 and the supporting base member 210 that is defined perpendicularly to the axis of rotation of the disk 10 is greater when the first and second disk storage portions 221 and 222 are opened as shown in FIG. 15B than when the first and second disk storage portions 221 and 222 are closed as shown in FIG. 15A. However, since the window 220*w* can have an increased opening area, the head can be designed much more flexibly.

Figure 16A:
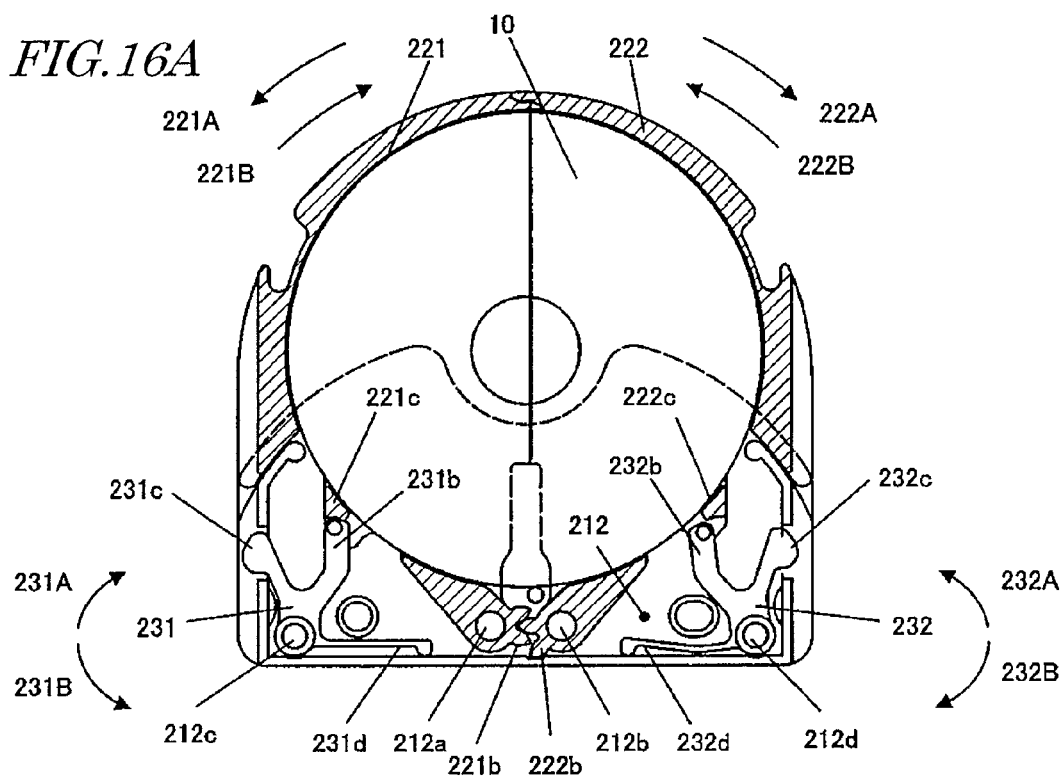
FIGS. 16A and 16B are partial cross-sectional views of the disk cartridge shown in FIG. 12 in a situation where only the second locking member has been unlocked and in a situation where both the first and second locking members have been unlocked.
Figure 16B:
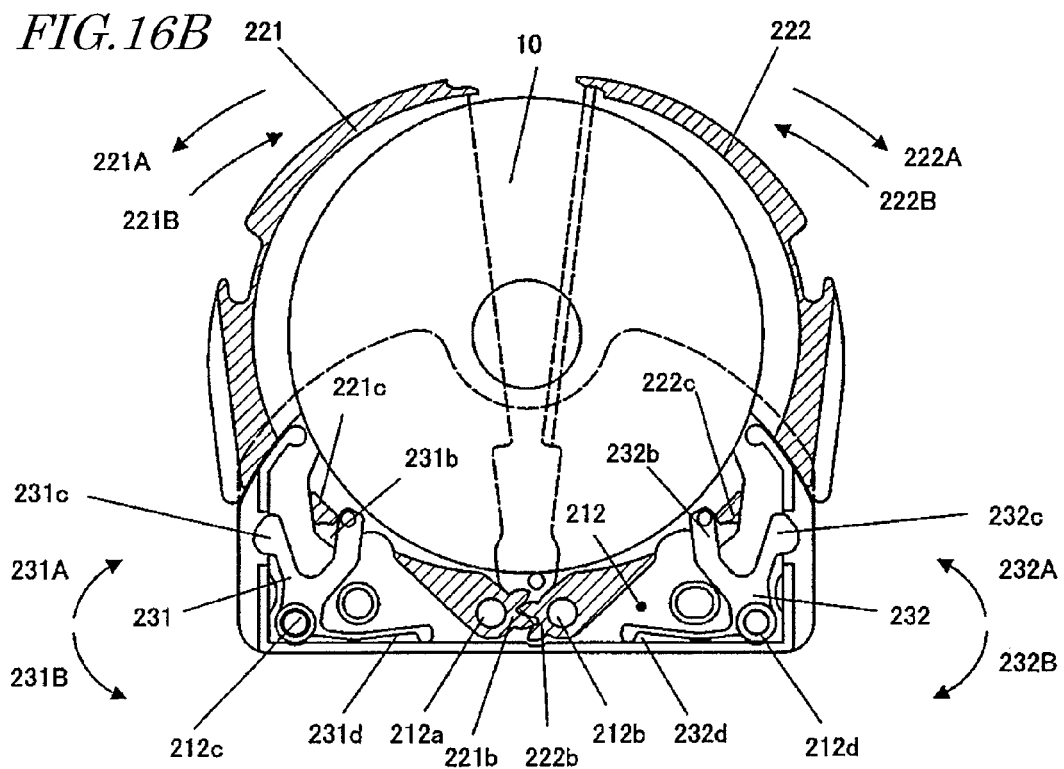

Next, an unlocking operation will be described. FIG. 16A illustrates a situation where only the second locking member 232 has been unlocked while the first and second disk storage portions 221 and 222 are locked with the first and second locking members 231 and 232. On the other hand, FIG. 16B illustrates a situation where both the first and second locking members 231 and 232 have been unlocked while the first and second disk storage portions 221 and 222 are locked with the first and second locking members 231 and 232. While closed, the first and second disk storage portions 221 and 222 are prevented from turning in the directions indicated by the arrows 221A and 222A, respectively, by the first and second locking members 231 and 232 as shown in FIG. 16A.

As shown in FIG. 16A, if the opener/closer 232*c* of the second locking member 232 is pressed down externally, the second locking member 232 rotates in the direction indicated by the arrow 232A with its elastic portion 232*d* deformed. In this state, the catching lever portion 232*b* of the second locking member 232 disengages itself from the latching portion 222*c* of the second disk storage portion 222. However, the first and second disk storage portions 221 and 222 are still engaged with each other by their engaging portions 221b and 222b and the first disk storage portion 221 is still locked by the first locking member 231. For that reason, the first disk storage portion 221 locked prevents the second disk storage portion 222 from rotating and never allows the user from opening the first and second disk storage portions 221 and 222. That is to say, even if one of the first and second locking members 231 and 232 were intentionally unlocked externally, the first and second disk storage portions 221 and 222 still could not be opened.

However, if the openers/closers 231c and 232c of the first and second locking members 231 and 232 are externally pressed down at the same time, the first and second locking members 231 and 232 rotate in the directions indicated by the arrows 231A and 232A, respectively, with their elastic portions 231d and 232d deformed as shown in FIG. 16B. In this state, the catching lever portions 231b and 232b of the first and second locking members 231 and 232 disengage themselves from the latching portions 221c and 222c of the first and second disk storage portions 221 and 222. As a result, the first and second disk storage portions 221 and 222 can now rotate in the directions indicated by the arrows 221A and 222A and can be opened eventually. As can be seen, only when the first and second locking members 231 and 232 are unlocked at the same time, the first and second disk storage portions 221 and 222 can be opened.

The disk drive of the present invention can be loaded with the disk cartridge 200 described above to read and write information from/on the disk 10 that is housed in the disk cartridge 200. As used herein, the "loaded" state refers to a state in which a read/write operation is ready to be performed on the disk that has already been mounted on the disk motor after the disk cartridge has been inserted into the disk drive. As the structure of the disk cartridge 200 has already been described, the following description of a preferred embodiment of a disk drive according to the present invention will be focused on the structure of the disk drive.

Figure 1:
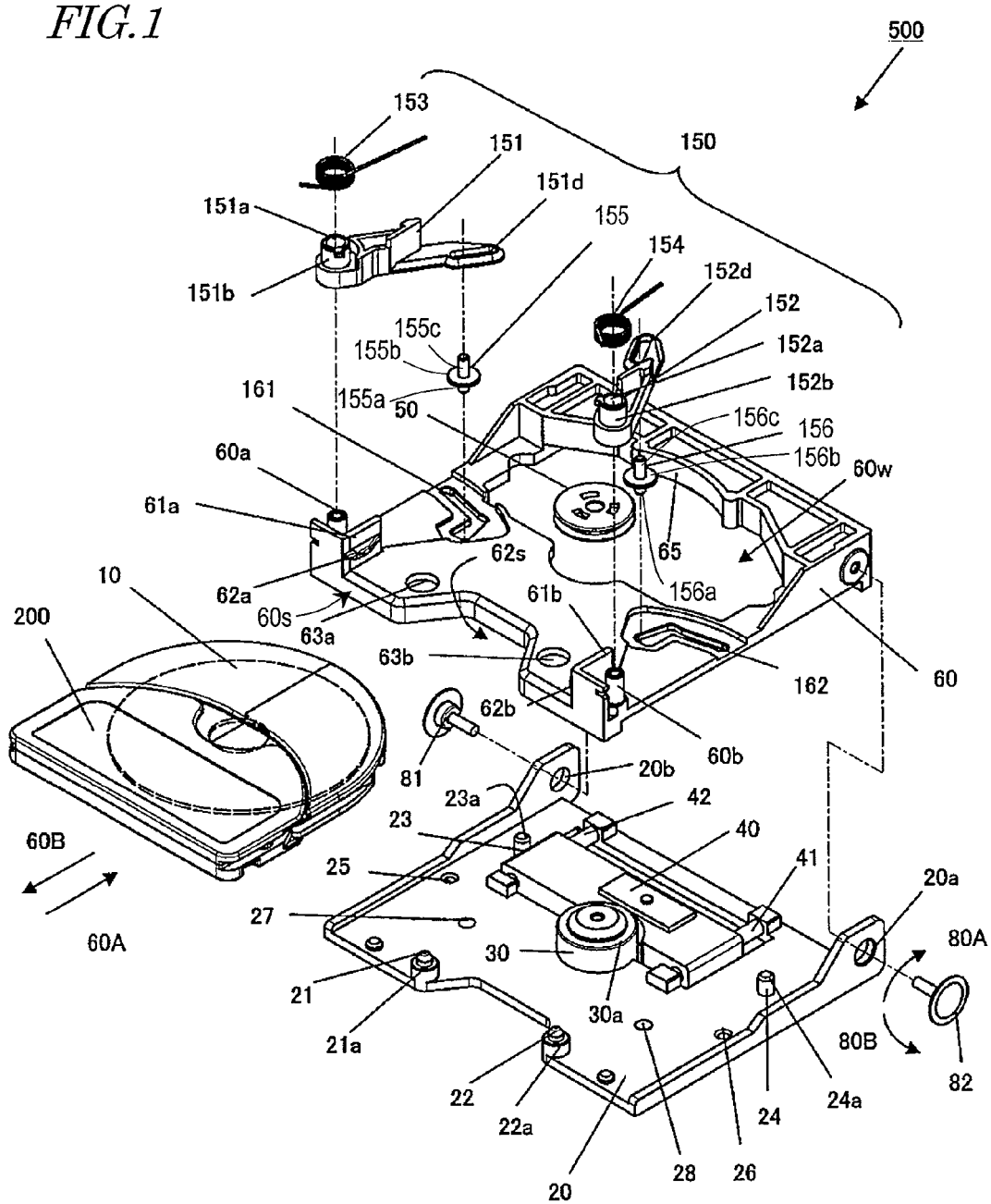
FIG. 1 is an exploded perspective view illustrating the structure of a disk drive as a preferred embodiment of the present invention.
Figure 2:
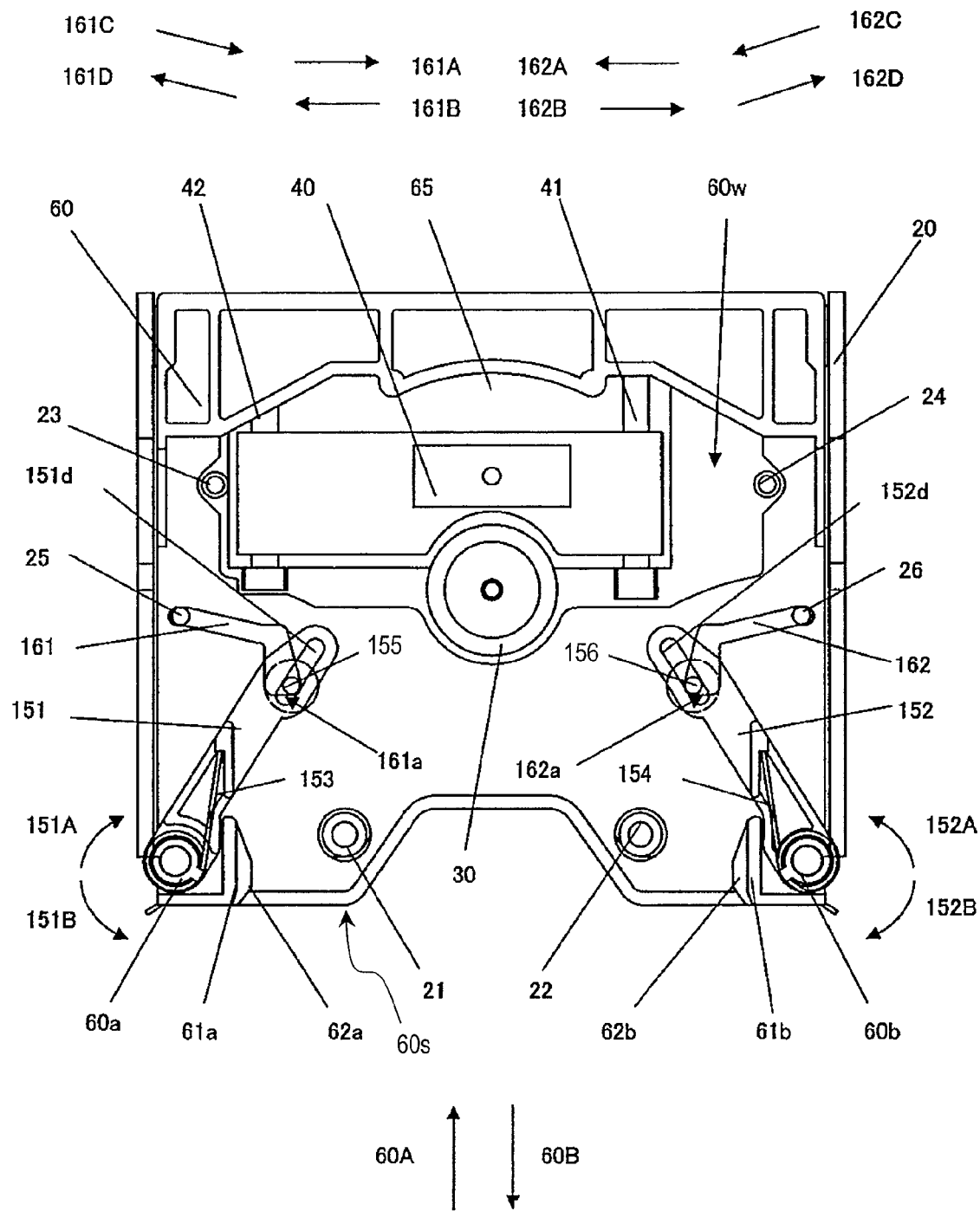
FIG. 2 is a plan view illustrating the structure of the disk drive shown in FIG. 1.
Figure 3A:
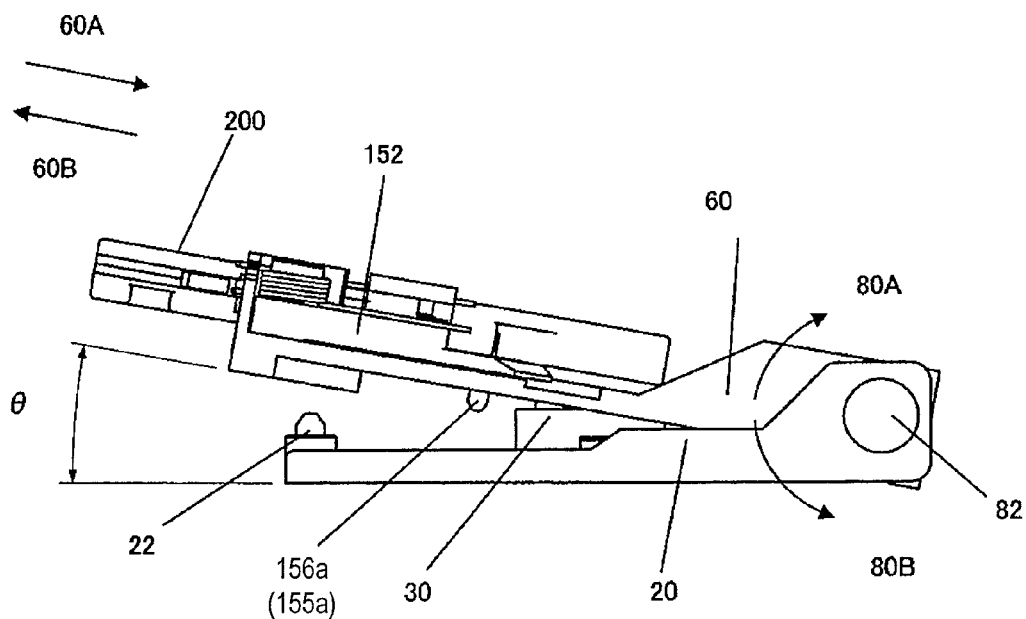
FIGS. 3A and 3B are side views illustrating the structure of the disk drive shown in FIG. 1 and showing the respective positions of its cartridge holder when a disk cartridge is inserted or ejected and when a read/write operation is performed on a disk housed there, respectively.
Figure 3B:
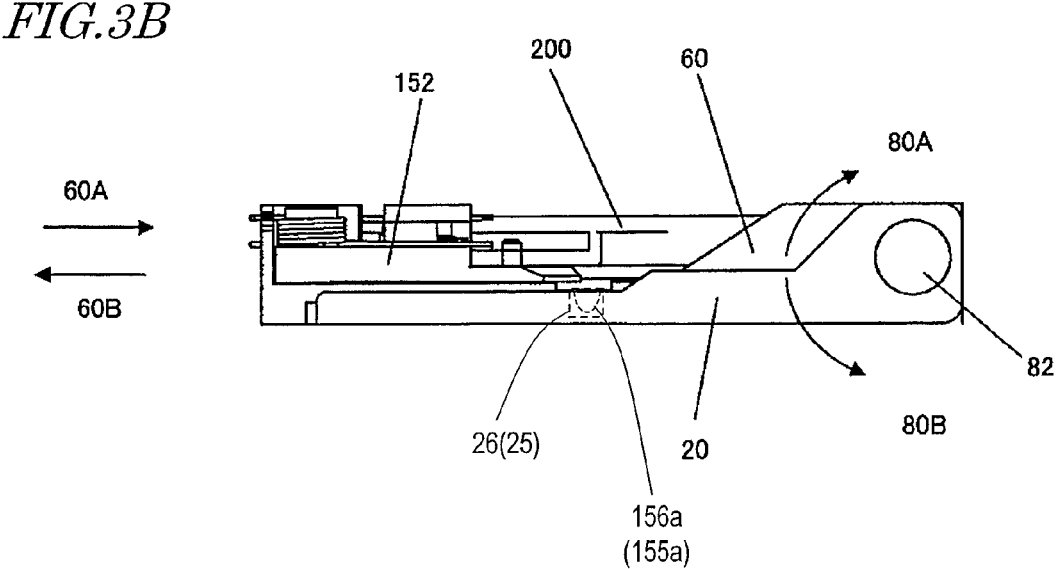

First, the structure of a disk drive 500 as a preferred embodiment of the present invention will be described with reference to FIGS. 1 through 4. Specifically, FIGS. 1 and 2 are respectively an exploded perspective view and a plan view illustrating a disk drive 500 as a preferred embodiment of the present invention, which can be loaded with the disk cartridge 200. On the other hand, FIGS. 3A and 3B are side views of the disk drive 500 in a situation where the disk cartridge 200 is being inserted or ejected and in a situation where a read/write operation is performed on the disk 10.

As shown in FIGS. 1 and 2, the disk drive 501 includes a traverse base 20, a disk motor 30 and an optical head 40.

The disk motor 30 has a disk mount 30a to mount the disk 10, which is housed in the disk cartridge 200, and is supported on the traverse base 20. The optical head 40 is supported on the traverse base 20 so as to move on guide shafts 41 and 42. Also, the optical head 40 is driven by a drive source (not shown), which is arranged on the traverse base 20, along the guide shafts 41 and 42 so as to move freely in the radial direction of the disk 10 that is mounted on the disk mount 30a of the disk motor 30.

The optical head 40 reads and writes information from/on the disk 10. The disk drive 501 may be either a device that can perform both read and write operations or a read-only or write-only device.

On the traverse base 20, arranged are cartridge positioning pins 21 and 22, which respectively have bearing surfaces 21a and 22a that will contact with the bottom of the lower supporting base portion 212 of the disk cartridge 200. The cartridge positioning pins 21 and 22 are used to position the disk cartridge 200 with respect to the disk motor 30. Also arranged on the traverse base 20 are a fixing pin 23 with a bearing surface 23a that will contact with the bottom of the first disk storage portion 221 of the disk cartridge 200 and another fixing pin 24 with a bearing surface 24a that will contact with the bottom of the second disk storage portion 222 of the disk cartridge 200. These bearing surfaces 23a and 24a, as well as the bearing surfaces 21a and 22a of the cartridge positioning pins 21 and 22, determine the vertical level of the disk cartridge 200.

The traverse base 20 also has guide member positioning holes 25 and 26 and guide member regulating holes 27 and 28. The guide member positioning holes 25 and 26 receive first and second guide members 151 and 152 (to be described in detail later), thereby positioning the first and second guide members 151 and 152 with respect to the disk motor 30 when the first and second disk storage portions 221 and 222 are opened. On the other hand, the guide member regulating holes 27 and 28 receive the first and second guide members 151 and 152 while there is no disk cartridge 200 in a cartridge holder 60.

The disk drive 500 further includes a clamper 50 and a cartridge holder 60 to be loaded with the disk cartridge 200.

The clamper 50 sandwiches the disk 10 between itself and the disk mount 30a of the disk motor 30, thereby clamping the disk 10 such that the disk 10 can be rotated by the disk motor 30. The clamper 50 is held by a clamper supporting member (not shown) and is supported on the cartridge holder 60.

The cartridge holder 60 holds the disk cartridge 200. The cartridge holder 60 has a holder opening 60s, through which the disk cartridge 200 can be externally inserted into the cartridge holder 60 in the direction indicated by the arrow 60A or through which the disk cartridge 200 held in the cartridge holder 60 is ejected out of the holder 60 in the direction indicated by the arrow 60B. The holder opening 60s is an opening provided for the cartridge holder 60. Other than that, the disk drive 500 may also have another opening in its housing that covers the disk drive entirely in order to insert and eject the disk cartridge 200 through that opening.

In the vicinity of the holder opening 60s of the cartridge holder 60, arranged are two guide walls 61a and 61b. The guide walls 61a and 61b define the inserting and ejecting directions of the disk cartridge 200. That is to say, the guide walls 61a and 61b contact with the side surfaces of the disk cartridge 200 being inserted into the cartridge holder 60 or ejected out of the cartridge holder 60, thereby guiding the disk cartridge 200 such that the disk cartridge 200 is inserted in the direction indicated by the arrow 60A or ejected in the direction indicated by the arrow 60B. The guide walls 61a and 61b are arranged only in the vicinity of the holder opening 60s.

The guide walls 61a and 61b include unlocking portions 62a and 62b that will go inside the unlocking slits 200a and 200b of the disk cartridge 200 being inserted in the direction indicated by the arrow 60A or ejected in the direction indicated by the arrow 60B, thereby pressing down the openers/closers 231c and 232c of the first and second locking members 231 and 232 of the disk cartridge 200.

The bottom of the cartridge holder 60 has a window 60w to allow the disk motor 30 and the optical head 40 to access the disk 10. Also, to prevent the cartridge positioning pins 21 and 22 from interfering with the cartridge holder 60, the bottom of the cartridge holder 60 has holes 63a and 63b. The cartridge holder 60 further has a positioning portion 65 for positioning the disk 10 at the center of the disk motor 30 when the cartridge holder 60 is loaded with the disk cartridge 200.

On the holder opening 60s of the cartridge holder 60, a notch 62s may be provided in order to partially expose the supporting base member of the disk cartridge 200 and thereby make it easier to remove the disk cartridge 200 from the cartridge holder 60.

Furthermore, shaft screws 81 and 82 that are inserted into the pivot holes 20a and 20b of the traverse base 20 are attached to the cartridge holder 60. As a result, the cartridge holder 60 is supported by the traverse base 20 so as to be freely rotatable in the directions indicated by the arrows 80A and 80B.

When the disk cartridge 200 is inserted into the cartridge holder 60 in the direction indicated by the arrow 60A or ejected out of the cartridge holder 60 in the direction indicated by the arrow 60B, the cartridge holder 60 is rotated θ degrees in the direction indicated by the arrow 80A with respect to the traverse base 20 as shown in FIG. 3A. When the cartridge holder 60 is located at this position (which will be referred to herein as a "first position"), the disk cartridge 200 can be inserted or ejected without interfering with the disk motor 30, optical head 40 or various positioning pins on the traverse base 20.

Also, by rotating the cartridge holder 60 with respect to the traverse base 20 in the direction indicated by the arrow 80B in a situation where the disk cartridge 200 has been inserted into the cartridge holder 60 and where the window 220w of the disk cartridge 200 has been opened, the disk motor 30 and the optical head 40 on the traverse base 20 enter the disk cartridge 200 through the window 220w and the various positioning pins fit into their positioning holes to position the disk cartridge 200 in place as shown in FIG. 3B. When the cartridge holder 60 is located at this position (i.e., the second position), the disk drive 500 is now loaded with the disk cartridge 200 so that a read/write operation is ready to be started on the disk 10 in the disk cartridge 200.

As shown in FIG. 1, the disk drive 500 further includes a cartridge opening/closing mechanism 150, which interlocks with portions of the disk cartridge 200. As the disk cartridge 200 is going to be inserted in the direction indicated by the arrow 60A or ejected in the direction indicated by the arrow 60B, the cartridge opening/closing mechanism 150 gradually opens or closes the first and second disk storage portions 221 and 222. As a result, the window to allow the optical head 40 to access the disk 10 and the disk motor 30 to mount the disk 10 is opened in the disk cartridge 200.

Specifically, the cartridge opening/closing mechanism 150 includes first and second guide members 155 and 156 and first and second guide grooves 161 and 162, which have been cut through the bottom of the cartridge holder 60.

As will be described later, the first and second guide members 155 and 156 can move along the first and second guide grooves 161 and 162, respectively. When the disk cartridge 200 is inserted, the gap between the first and second guide members 155 and 156 is narrower than the gap between the guide walls 61a and 61b. That is why the first and second guide members 155 and 156 can engage with portions of the disk cartridge 200 just as intended.

The first guide member 155 includes a base portion 155b having a bearing surface to contact with the surface of the cartridge holder 60 with the first guide groove 161, a guide groove projection 155a that is arranged on the base portion 155b and will be inserted into the first guide groove 161, and a cartridge projection 155c that is also arranged on the base portion 155b, protrudes in the opposite direction to the guide groove projection 155a and will fit into the notched portion 221d of the first disk storage portion 221. Likewise, the second guide member 156 also includes a base portion 156b, a guide groove projection 156a, and a cartridge projection 156c and has the same structure as the first guide member 155.

As the disk cartridge 200 is inserted deeper, the first and second guide members 155 and 156 move along the first and second guide grooves 161 and 162, respectively, so as to widen their gap gradually until their gap becomes broader than the gap between the guide walls 61a and 61b. As a result, the window is opened inside the disk cartridge 200.

To get the first and second guide members 155 and 156 engaged with portions of the disk cartridge 200 being inserted, the gap between the first and second guide members 155 and 156 is preferably narrower than the gap between the guide walls 61a and 61b. For that reason, biasing force is preferably applied to the first and second guide members 155 and 156 so as to narrow the gap between them. For that purpose, the first and second guide members 155 and 156 may be connected together with an elastic body such as a spring, for example.

In this preferred embodiment, the cartridge opening/closing mechanism 150 further includes first and second biasing levers 151 and 152 that engage with the first and second guide members 155 and 156, respectively, to apply biasing force to the first and second guide members 155 and 156 in predetermined directions, and elastic bodies (specifically, first and second lever biasing springs 153 and 154) for applying biasing force to the first and second biasing levers 151 and 152.

The first and second biasing levers 151 and 152 have pivot holes 151a and 152a, respectively, and are supported on the cartridge holder 60 so as to turn around pivots 60a and 60b on the cartridge holder 60 when the pivots 60a and 60b are inserted into the pivot holes 151a and 152a, respectively.

The first and second biasing levers 151 and 152 also have engaging grooves 151d and 152d, into which the cartridge projections 155c and 156c of the first and second guide members 155 and 156 are respectively inserted.

On the other hand, the guide groove projections 155a and 156a of the first and second guide members 155 and 156 are inserted into the first and second guide grooves 161 and 162, respectively. Thus, the base portions 155b and 156b of the first and second guide members 155 and 156 are respectively sandwiched between the first and second biasing levers 151, 152 and the cartridge holder 60.

As the first and second guide members 155 and 156 move along the first and second guide grooves 161 and 162, respectively, the first and second biasing levers 151 and 152, interlocked with the first and second guide members 155 and 156 at the engaging grooves 151d and 152d, turn around their pivots 60a and 60b, respectively.

The first and second lever biasing springs 153 and 154 are attached to the pivots 151b and 152b of the first and second biasing levers 151 and 152, respectively, thereby applying biasing force to the first biasing lever 151 in the direction indicated by the arrow 151A and to the second biasing lever 152 in the direction indicated by the arrow 152A, respectively. As a result, the biasing force is also applied by the first and second lever biasing springs 153 and 154 to the first and second guide members 155 and 156, which are interlocked with the first and second biasing levers 151 and 152 at the engaging grooves 151d and 152d, respectively, such that the guide members 155 and 156 come closer to each other.

The pivots 60a and 60b are arranged closer to the front end of the disk drive 500 (i.e., in the vicinity of the holder opening 60s of the cartridge holder 60) than the engaging grooves 151d and 152d of the first and second biasing levers 151 and 152, into which the first and second guide members 155 and 156 are fitted, are as shown in FIG. 2. Also, the pivots 60a and 60b are arranged symmetrically with respect to a plane that is parallel to the inserting and ejecting directions of the disk cartridge 200 (i.e., the directions indicated by the arrows 60A and 60B) and that includes the axis of rotation of the disk 10.

In the same way, the first and second guide grooves 161 and 162 are also arranged symmetrically with respect to that plane that is parallel to the inserting and ejecting directions of the disk cartridge 200 (i.e., the directions indicated by the arrows 60A and 60B) and that includes the axis of rotation of the disk 10 as shown in FIG. 2.

That is to say, the pair of biasing levers 151 and 152 and the pair of guide members 155 and 156 that move along the first and second guide grooves 161 and 162, respectively, are arranged symmetrically with respect to that plane that is parallel to the inserting and ejecting directions of the disk cartridge 200 (i.e., the directions indicated by the arrows 60A and 60B) and that includes the axis of rotation of the disk 10.

Figure 4A:
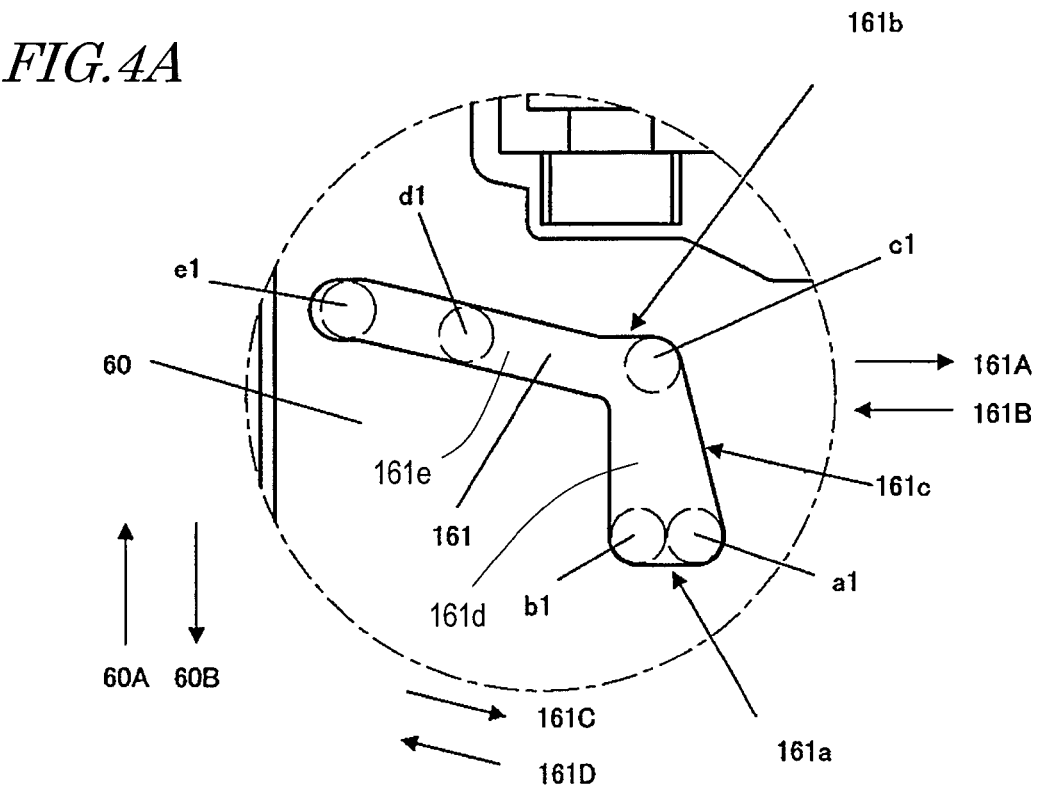
FIGS. 4A and 4B are plan views illustrating the respective structures of the first and second guide grooves in the cartridge opening/closing mechanism of the disk drive shown in FIG. 1.

As shown in FIG. 4A, the first guide groove 161 consists essentially of two groove portions 161d and 161e. The groove portion 161d defines a space in which the guide groove projection 155a of the first guide member 155 can move parallel to the inserting and ejecting directions of the disk cartridge 200 (i.e., in the directions indicated by the arrows 60A and 60B). On the other hand, the groove portion 161e defines a space in which the guide groove projection 155a of the first guide member 155 can move in the directions indicated by the arrows 161C and 161D, which intersect with the inserting and ejecting directions of the disk cartridge 200.

It will be described in detail later how the disk drive 500 operates as the first guide member 155 goes through these groove portions. In summary, while the guide groove projection 155a is moving inside the groove portion 161d in the directions indicated by the arrows 60A and 60B, the first guide member 161 gets engaged with the notch 221d of the first disk storage portion 221, unlocks the disk cartridge 200 until the guide groove projection 155a reaches the position c1 shown in FIG. 4A, and ejects the disk cartridge 200 after the window 220w has been closed. On the other hand, while the guide groove projection 155a is moving inside the groove portion 161e in the directions indicated by the arrows 161C and 161D, the first guide member 161 opens or closes the first disk storage portion 221 as the disk cartridge 200 is inserted or ejected.

Figure 4B:
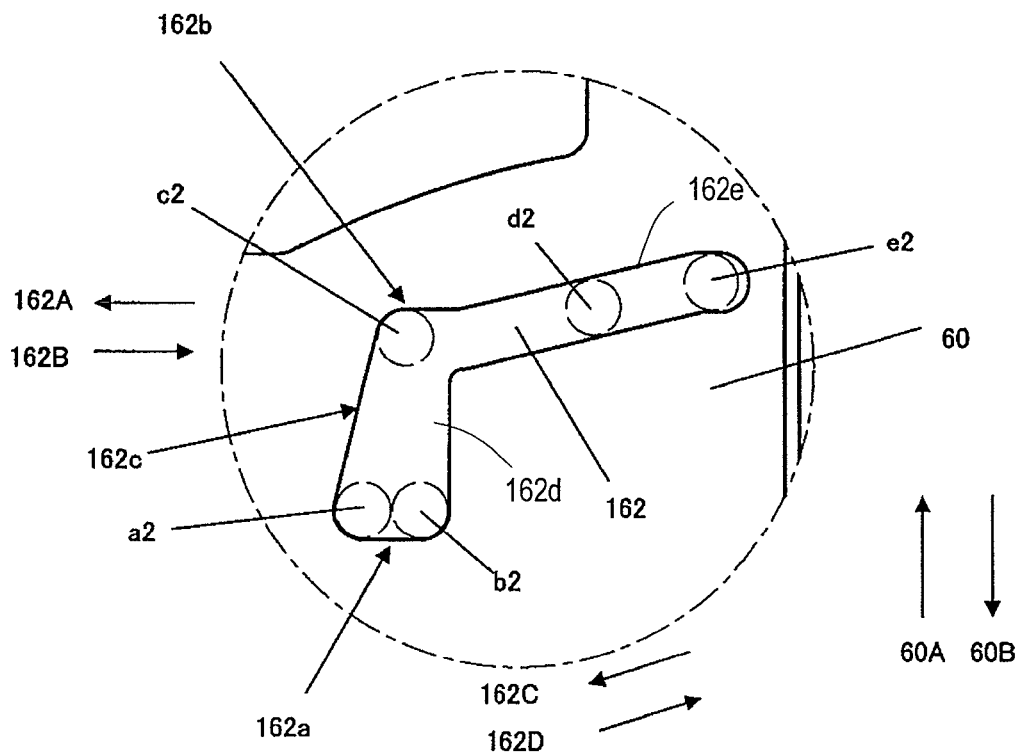

Likewise, as shown in FIG. 4B, the second guide groove 162 consists essentially of two groove portions 162d and 162e. The groove portion 162d defines a space in which the guide groove projection 156a of the second guide member 156 can move parallel to the inserting and ejecting directions of the disk cartridge 200 (i.e., in the directions indicated by the arrows 60A and 60B). On the other hand, the groove portion 162e defines a space in which the guide groove projection 156a of the second guide member 156 can move in the directions indicated by the arrows 162C and 162D, which intersect with the inserting and ejecting directions of the disk cartridge 200. In summary, while the guide groove projection 156a is moving inside the groove portion 162d in the directions indicated by the arrows 60A and 60B, the second guide member 162 gets engaged with the notch 222d of the second disk storage portion 222, unlocks the disk cartridge 200 until the guide groove projection 156a reaches the position c2 shown in FIG. 4B, and ejects the disk cartridge 200 after the window 220w has been closed. On the other hand, while the guide groove projection 156a is moving inside the groove portion 162e in the directions indicated by the arrows 162C and 162D, the second guide member 162 opens or closes the second disk storage portion 222 as the disk cartridge 200 is inserted or ejected.

Also, as the first and second lever biasing springs 153 and 154 apply biasing force to the first and second biasing levers 151 and 152, the first and second guide members 155 and 156 are brought into contact with the first and second guide grooves 161 and 162, respectively, and held at predetermined standby positions (i.e., the positions a1 and a2 shown in FIG. 4) as shown in FIG. 2.

While the cartridge holder 60 has not been loaded with the disk cartridge 200 yet, the first and second guide members 155 and 156 are in contact with the first and second guide grooves 161 and 162 and held at their predetermined standby positions as shown in FIG. 2. As described above, the traverse base 20 has the guide member regulating holes 27 and 28 as shown in FIG. 1. That is why if the cartridge holder 60 is rotated to assume the position shown in FIG. 3B while the cartridge holder 60 has not been loaded with the disk cartridge 200 yet, the first and second guide members 155 and 156 will fit into the guide member regulating holes 27 and 28, respectively. As a result, the cartridge holder 60 gets held by the traverse base 20. Consequently, even if the cartridge holder 60 has not been loaded with the disk cartridge 200 yet, the cartridge opening/closing mechanism 150 can still be held and regulated by the traverse base 20, and therefore, rattling that would be caused due to some disturbances such as vibrations and shocks can be minimized.

Next, it will be described how the cartridge opening/closing mechanism 150 works. In the disk drive 500 of this preferred embodiment, as the disk cartridge 200 is inserted deeper into the cartridge holder 60 in the direction indicated by the arrow 60A, the cartridge opening/closing mechanism 150 gradually opens the disk housing 220. On the other hand, as the disk cartridge 200 is ejected in the direction indicated by the arrow 60B, the cartridge opening/closing mechanism 150 gradually closes the disk housing 220.

It should be noted that the disk drive 500 of the present invention has no drive source for loading the disk cartridge 200 automatically. That is to say, the disk cartridge 200 is manually inserted in the direction indicated by the arrow 60A by the operator. On the other hand, the disk cartridge 200 is ejected in the direction indicated by the arrow 60B by using the biasing force applied by the first and second lever biasing springs 153 and 154 and then removed manually by the operator.

First, it will be described with reference to FIGS. 5 through 9 how the cartridge opening/closing mechanism 150 opens the disk housing of the disk cartridge 200 being inserted into the cartridge holder 60.

While the disk cartridge 200 is being inserted or ejected into/out of the cartridge holder 60, the cartridge holder 60 is tilted with respect to the traverse base 20 as shown in FIG. 3A. However, the traverse base 20 has nothing to do with the operation of inserting or ejecting the disk cartridge 200 but only the cartridge holder 60 has something to do with it. For that reason, the cartridge holder 60 and the traverse base 20 are illustrated on the same plane in FIGS. 5 through 8 for the sake of convenience. And FIG. 9 illustrates a situation where the cartridge holder 60 has been loaded with the disk cartridge 200. In this state, the cartridge holder 60 has been lowered and is now on a level with the traverse base 20 as shown in FIG. 3B such that the disk 10 in the disk cartridge 200 is mounted on the disk mount 30a of the disk motor 30.

As described above, in the first and second guide members 155 and 156, the guide groove projections 155a and 156a fit into the first and second guide grooves 161 and 162, respectively, while the cartridge projections 155c and 156c engage with the notches 221d and 222d of the first and second disk storage portions 221 and 222, respectively. In the plan views shown in FIGS. 5 through 9, however, these projections perfectly overlap with each other. For that reason, in the following description, the guide groove projections 155a and 156a and the cartridge projections 155c and 156c will not be distinguished from each other but will be collectively referred to herein as the first and second guide members 155 and 156.

Figure 5:
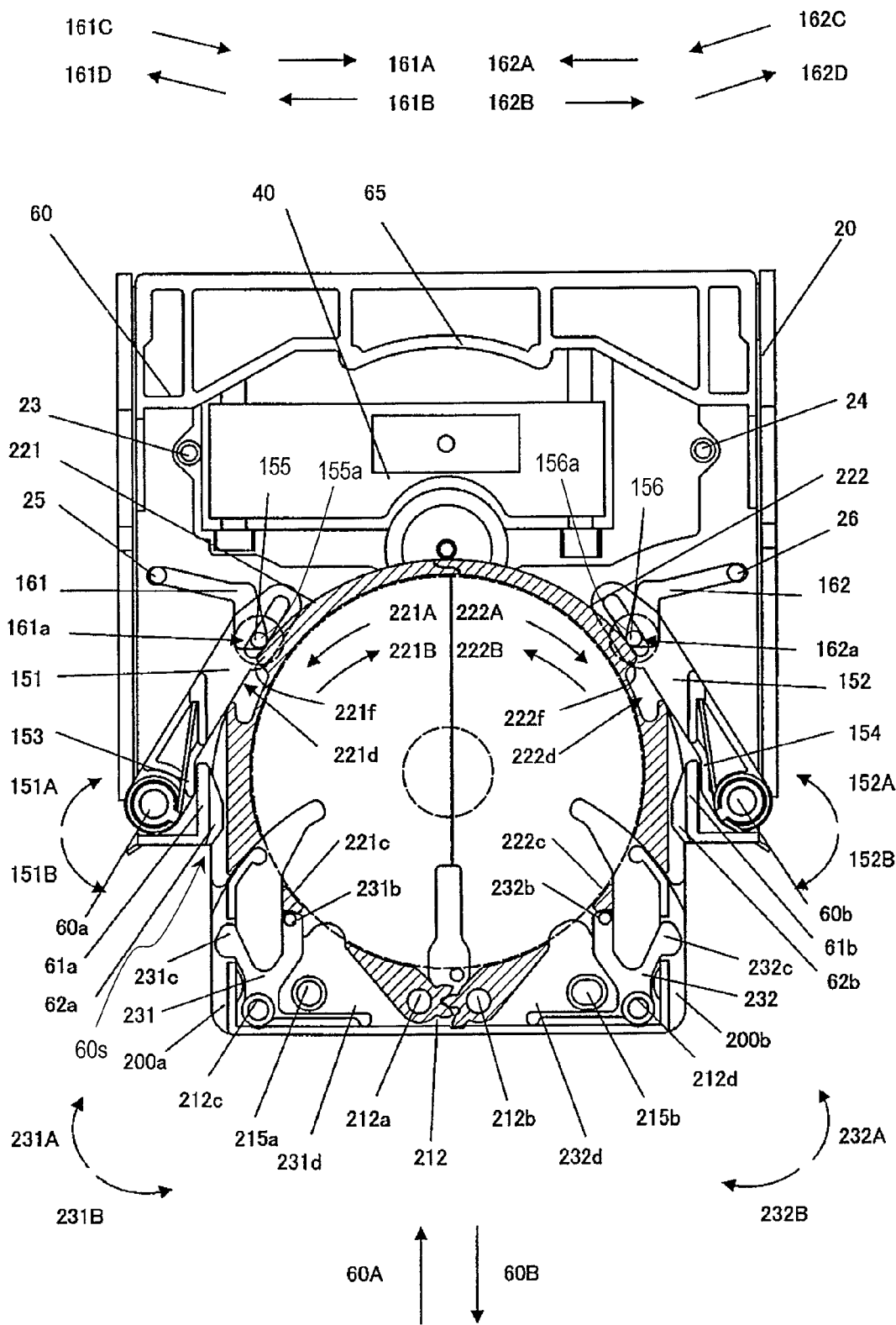
FIG. 5 is a plan view illustrating one state of the cartridge opening/closing mechanism of the disk drive shown in FIG. 1 either during an opening operation or during a closing operation.

First, as shown in FIG. 5, the operator manually inserts the disk cartridge 200 through the holder opening 60s into the cartridge holder 60 in the direction indicated by the arrow 60A. In this case, the disk cartridge 200 is inserted into the cartridge holder 60 while being guided by the guide walls 61a and 61b of the cartridge holder 60 in its width direction, i.e., in the direction that intersects with the inserting direction 60A at right angles.

At this point in time, biasing force is applied by the first and second biasing levers 151 and 152 to the first and second guide members 155 and 156 such that the gap between the guide members 155 and 156 narrows. That is why the first and second guide members 155 and 156 are in contact with the guide faces 161a and 162a of the first and second guide grooves 161 and 162 and are held in their predetermined standby positions (i.e., the positions a1 and a2 shown in FIG. 4). The gap between the first and second guide members 155 and 156 is narrower than that between the guide walls 61a and 61b. For that reason, as the disk cartridge 200 is inserted deeper, the first and second guide members 155 and 156 will soon contact with the outer side surface of the first and second disk storage portions 221 and 222.

In the meantime, the unlocking portions 62a and 62b of the guide walls 61a and 61b respectively go through the unlocking slits 200a and 200 of the disk cartridge 200.

As the disk cartridge 200 is inserted even deeper than the position shown in FIG. 5 in the direction indicated by the arrow 60A, the first guide member 155 soon contacts with the notch 221d on the outer side surface of the first disk storage portion 221 to overcome the biasing force applied by the first biasing lever 151 in the direction indicated by the arrow 151A and move along the guide face 161a of the first guide groove 161 in the direction indicated by the arrow 161B. After having reached the position b1 shown in FIG. 4, the first guide member 155 starts going back in the direction indicated by the arrow 161A along the guide face 161a due to the biasing force applied by the first biasing lever 151 again and then contacts with the catching contact face 221f of the notch 221d of the first disk storage portion 221.

In the same way, the second guide member 156 soon contacts with the notch 222d on the outer side surface of the second disk storage portion 222 to overcome the biasing force applied by the second biasing lever 152 in the direction indicated by the arrow 152A and move along the guide face 162a of the second guide groove 162 in the direction indicated by the arrow 162B. After having reached the position b2 shown in FIG. 4, the second guide member 156 starts going back in the direction indicated by the arrow 162A along the guide face 162a due to the biasing force applied by the second biasing lever 152 again and then contacts with the catching contact face 222f of the notch 222d of the second disk storage portion 222.

Figure 6:
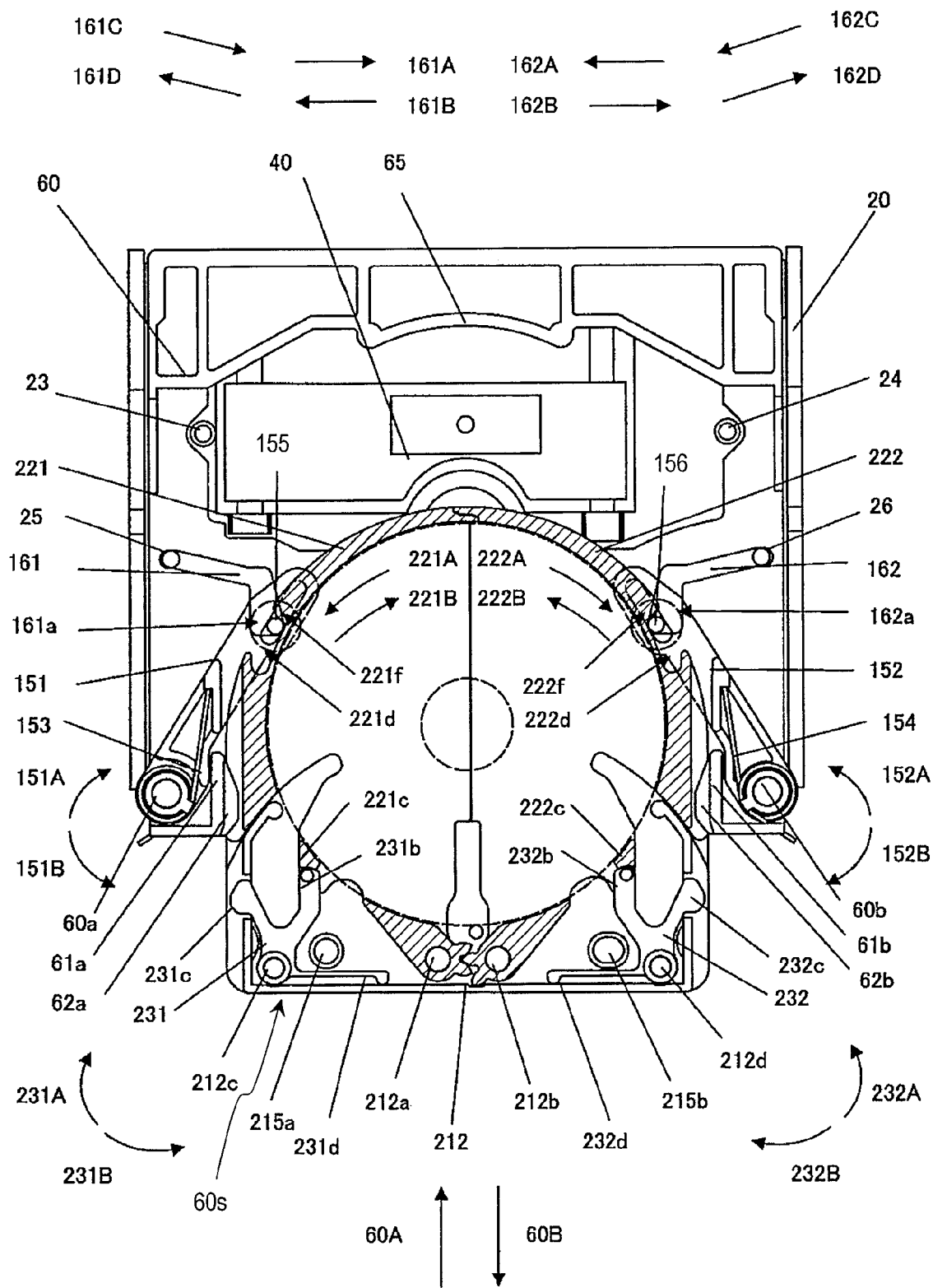
FIG. 6 is a plan view illustrating another state of the cartridge opening/closing mechanism of the disk drive shown in FIG. 1 either during the opening operation or during the closing operation.

As the disk cartridge 200 is inserted even deeper than the position shown in FIG. 6 in the direction indicated by the arrow 60A, the first guide member 155 further goes on the inner wall of the notch 221d of the first disk storage portion 221 under the biasing force applied by the first biasing lever 151 to reach the semicircular catching portion 221e of the notch 221d and get latched there. As a result, the first guide member 155 that moves along the first guide groove 161 and the first disk storage portion 221 form a first link mechanism.

In the same way, the second guide member 156 further goes on the inner wall of the notch 222d of the second disk storage portion 222 under the biasing force applied by the second biasing lever 152 to reach the semicircular catching portion 222e of the notch 222d and get latched there. As a result, the second guide member 156 that moves along the second guide groove 162 and the second disk storage portion 222 form a second link mechanism.

Figure 7:
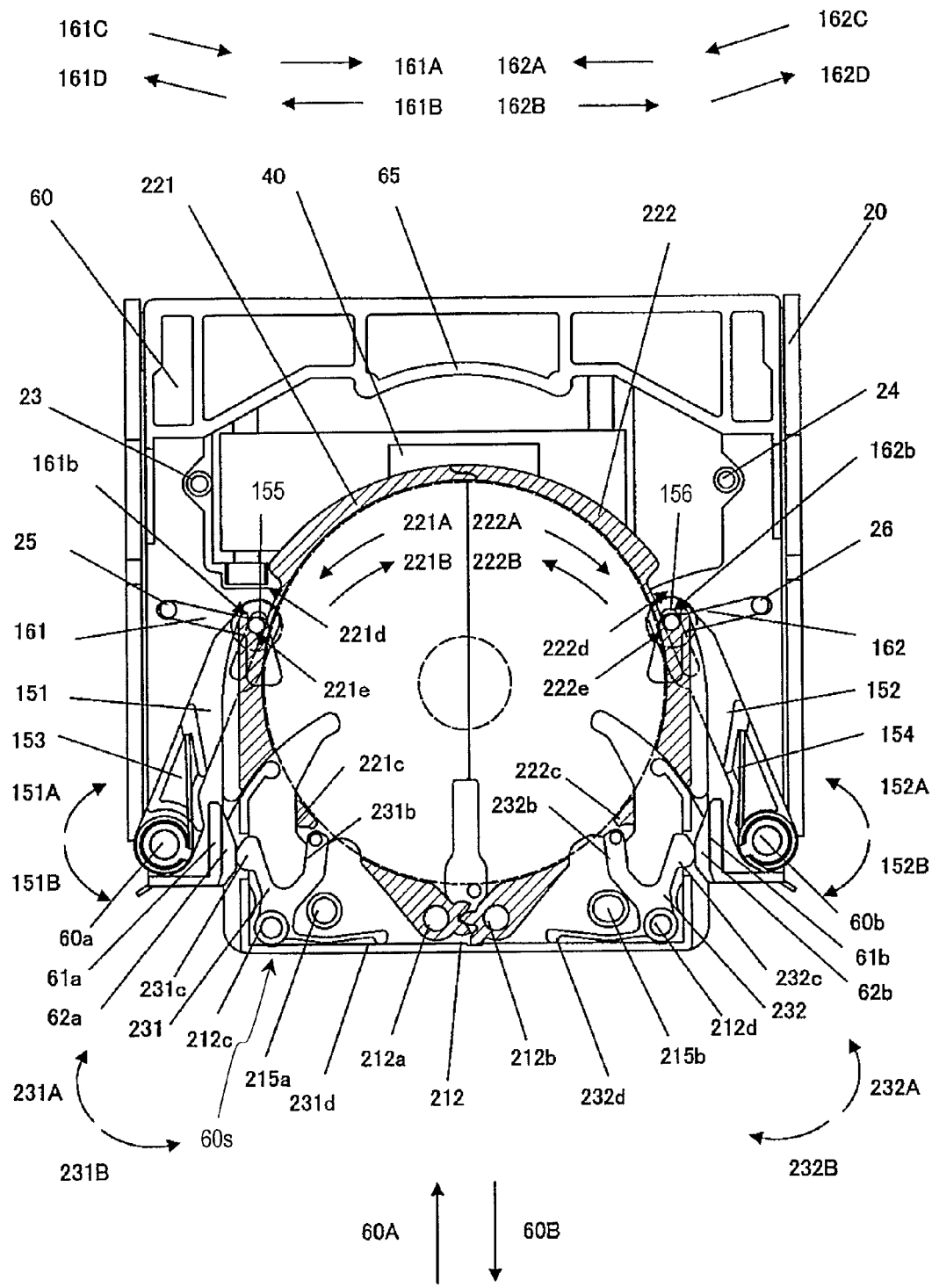
FIG. 7 is a plan view illustrating still another state of the cartridge opening/closing mechanism of the disk drive shown in FIG. 1 either during the opening operation or during the closing operation.

As the disk cartridge 200 is inserted even deeper in the direction indicated by the arrow 60A, the first and second guide members 155 and 156, which are now engaged with the notches 221d and 222d of the first and second disk storage portions 221 and 222, continue to go along the first and second guide grooves 161 and 162 in the direction indicated by the arrow 60A until the guide members 155 and 156 hit the guide faces 161b and 162b of the first and second guide grooves 161 and 162 as shown in FIG. 7 (i.e., reach the positions c1 and c2 shown in FIG. 4).

In the meantime, the unlocking portions 62a and 62b press the openers/closers 231c and 232c of the first and second locking members 231 and 232 at the same time, thereby turning the first and second locking members 231 and 232 in the directions indicated by the arrows 231A and 232A, respectively, while deforming their elastic portions 231d and 232d simultaneously. As a result, the catching lever portions 231b and 232b of the first and second locking members 231 and 232 disengage themselves from the latching portions 221c and 222c of the first and second disk storage portions 221 and 222, thereby unlocking the first and second disk storage portions 221 and 222. As a result, the first and second disk storage portions 221 and 222 are now ready to rotate in the directions indicated by the arrows 221A and 222A, respectively.

Figure 8:
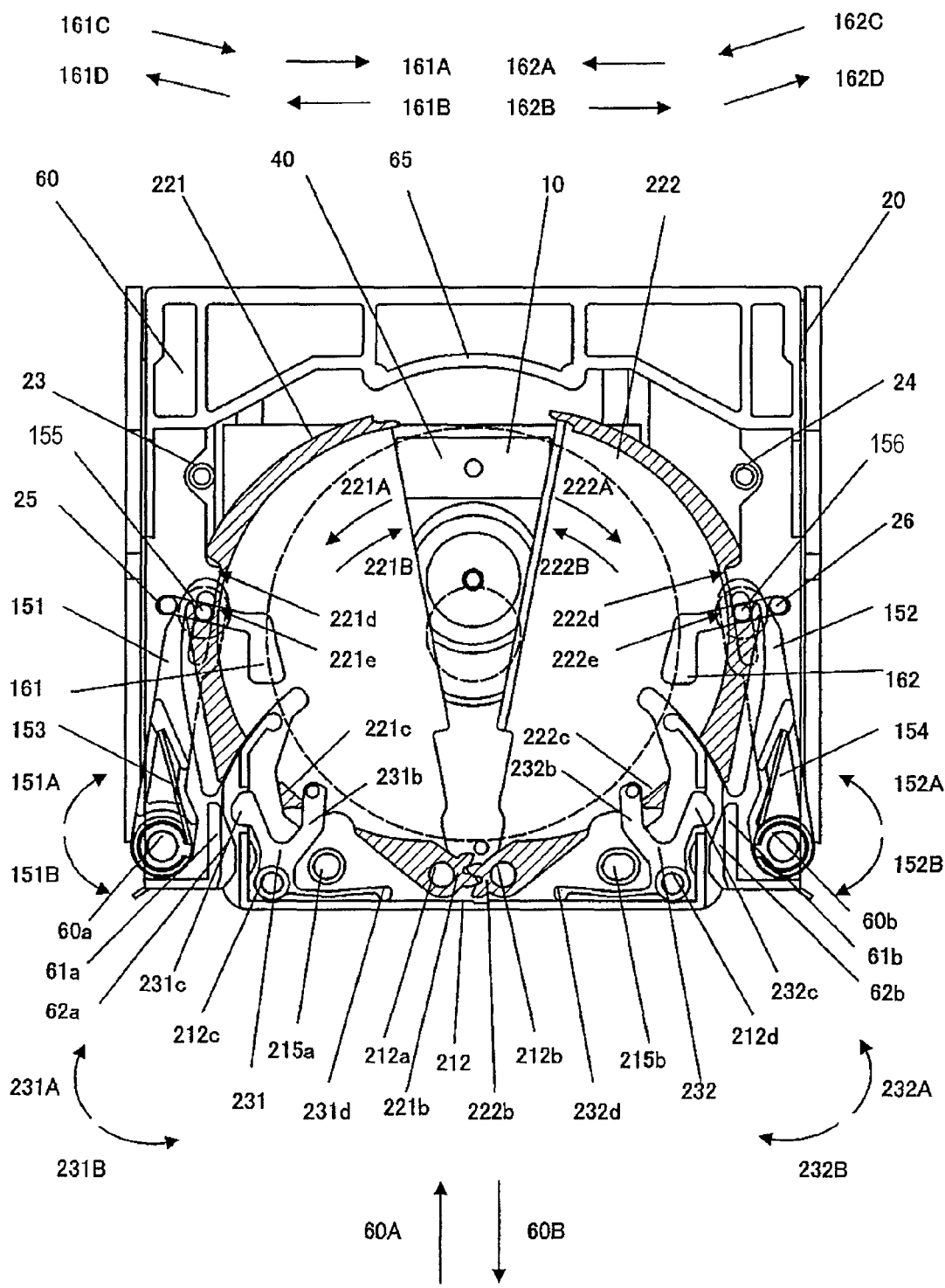
FIG. 8 is a plan view illustrating yet another state of the cartridge opening/closing mechanism of the disk drive shown in FIG. 1 either during the opening operation or during the closing operation.
Figure 9:
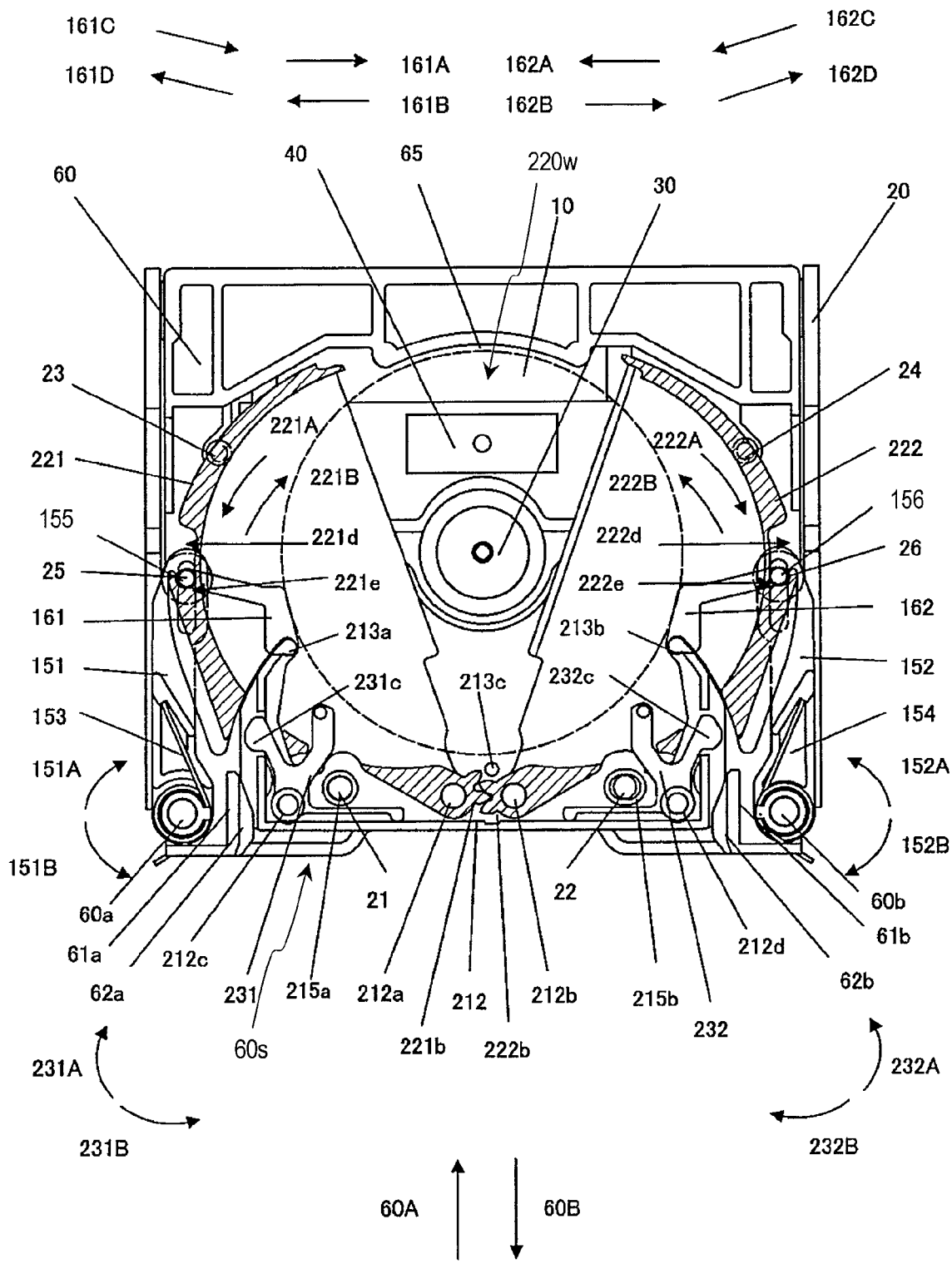
FIG. 9 is a plan view illustrating yet another state of the cartridge opening/closing mechanism of the disk drive shown in FIG. 1 either during the opening operation or during the closing operation.

As the disk cartridge 200 is inserted even deeper than the position shown in FIG. 7 in the direction indicated by the arrow 60A, the first and second guide members 155 and 156 start being moved along the first and second guide grooves 161 and 162 in the directions indicated by the arrows 161D and 162D, respectively, by the first link mechanism formed by the first guide member 155, moving along the first guide groove 161, and the first disk storage portion 221 and by the second link mechanism formed by the second guide member 156, moving along the second guide groove 162, and the second disk storage portion 222 as shown in FIG. 8. Meanwhile, the first and second disk storage portions 221 and 222 start rotating around their pivots 212a and 212b in the directions indicated by the arrows 221A and 222A, respectively.

In the meantime, the lower supporting base portion 212 is guided by the guide walls 61a and 61b in the directions indicated by the arrows 60A and 60B. Therefore, the pivot 212a of the first disk storage portion 221 functions as a slider that can move only in the directions indicated by the arrows 60A and 60B. On the other hand, the first guide member 155 functions as a slider that moves along the first guide groove 161 in the directions indicated by the arrows 161C and 161D (see the position d1 shown in FIG. 4). As a result, the first link mechanism is formed by the first guide member 155 that moves along the first guide groove 161 and the first disk storage portion 221.

Specifically, the first link mechanism is formed by the first guide member 155 that performs a slide operation in the directions indicated by the arrows 161C and 161D, the pivot 212a of the first disk storage portion 221 that performs a slide operation in the directions indicated by the arrows 60A and 60B, and the first disk storage portion 221 that functions as a link connecting these two sliders performing their respective slide operations. As the first guide member 155 performs its slide operation in the direction indicated by the arrow 161D, the first disk storage portion 221 rotates in the direction indicated by the arrow 221A.

Likewise, the lower supporting base portion 212 is guided by the guide walls 61a and 61b in the directions indicated by the arrows 60A and 60B. Therefore, the pivot 212b of the second disk storage portion 222 functions as a slider that can move only in the directions indicated by the arrows 60A and 60B. On the other hand, the second guide member 156 functions as a slider that moves along the second guide groove 162 in the directions indicated by the arrows 162C and 162D (see the position d2 shown in FIG. 4). As a result, the second link mechanism is formed by the second guide member 156 that moves along the second guide groove 162 and the second disk storage portion 222.

Specifically, the second link mechanism is formed by the second guide member 156 that performs a slide operation in the directions indicated by the arrows 162C and 162D, the pivot 212b of the second disk storage portion 222 that performs a slide operation in the directions indicated by the arrows 60A and 60B, and the second disk storage portion 222 that functions as a link connecting these two sliders performing their respective slide operations. As the second guide member 156 performs its slide operation in the direction indicated by the arrow 162D, the second disk storage portion 222 rotates in the direction indicated by the arrow 222A.

Thus, as the first and second guide members 155 and 156 slide along the first and second guide grooves 161 and 162 in the directions indicated by the arrows 161D and 162D, respectively, the first and second disk storage portions 221 and 222 rotate in the directions indicated by the arrows 221A and 222A, respectively, using the pair of link mechanisms (including the first and second guide members 155 and 156), thereby opening the disk housing 220. In this case, the angle of rotation of the first and second disk storage portions 221 and 222 is determined according to how deep the disk cartridge 200 is inserted in the direction indicated by the arrow 60A.

Also, in this case, as the first and second disk storage portions 221 and 222 rotate in mutually opposite directions synchronously with each other at the engaging portions 221b and 222b that engage with each other, the first and second guide members 155 and 156 also slide in mutually opposite directions via the first and second disk storage portions 221 and 222.

Meanwhile, the first and second guide grooves 161 and 162 are arranged symmetrically with respect to the direction in which the disk cartridge 200 is inserted (i.e., the direction indicated by the arrow 60A). That is why the first link mechanism formed by the first guide member 155 that moves along the first guide groove 161 and the first disk storage portion 221 and the second link mechanism formed by the second guide member 156 that moves along the second guide groove 162 and the second disk storage portion 222 operate symmetrically with respect to the direction in which the disk cartridge 200 is inserted (i.e., the direction indicated by the arrow 60A). Consequently, it is possible to guarantee that the disk cartridge 200 being inserted goes straight in its inserting direction.

Meanwhile, portions of the first and second biasing levers 151 and 152 near their engaging grooves 151d and 152d contact with, and support, the bottom of the first and second disk storage portions 221 and 222. In this manner, while the disk cartridge 200 is being inserted in the direction indicated by the arrow 60A, the first and second disk storage portions 221 and 222 can be guided in the height direction.

Consequently, the first and second guide members 155 and 156, moving along the first and second guide grooves 161 and 162, and the first and second biasing levers 151 and 152, both of which are arranged symmetrically with respect to the direction in which the disk cartridge 200 is inserted (i.e., the direction indicated by the arrow 60A), make sure that the disk cartridge 200 goes straight and guide the disk cartridge 200 in the height direction. As a result, in the disk cartridge 200, the disk housing 220 can be opened with stability.

Next, as the disk cartridge 200 is inserted even deeper in the direction indicated by the arrow 60A than the position shown in FIG. 8, the disk cartridge 200 is now inserted into the cartridge holder 60 fully as shown in FIG. 9, the first and second guide members 155 and 156 now reach the positions e1 and e2 shown in FIG. 4 and the first and second disk storage portions 221 and 222 have rotated to form a predetermined angle between them, thereby opening the window 220w.

At this point in time, the positioning portion 65 of the cartridge holder 60 enters the window 220w. Also, the position regulating portions 213a, 213b and 213c of the lower supporting base portion 212 and the positioning portion 65 contact with the outer side surface of the disk 10, thereby regulating the position of the disk 10 and positioning the center of the disk 10 when the window 220w is opened.

When the operator turns the cartridge holder 60 in the direction indicated by the arrow 80B such that the cartridge holder 60, forming a predetermined tilt angle θ with respect to the traverse base 20 as shown in FIG. 3A, gets ready to perform a read/write operation on the disk 10 as shown in FIG. 3B, the cartridge positioning pins 21 and 22 of the traverse base 20 fit into the positioning holes 215a and 215b of the lower supporting base portion 212. As a result, the lower supporting base portion 212 is positioned with respect to the traverse base 20. At the same time, the pivots 212a and 212b, around which the first and second disk storage portions 221 and 222 turn, are also positioned with respect to the traverse base 20.

Consequently, the pivot 212a of the first disk storage portion 221 that has been movable in the directions indicated by the arrows 60A and 60B is fixed at the predetermined position. Also, the first link mechanism fixes the first guide member 155, which has been movable in the directions indicated by the arrows 161C and 161D along the first guide groove 161, at its predetermined position. Consequently, the catching portion 221e of the first disk storage portion 221 that engages with the first guide member 155 has its position defined uniquely with respect to the traverse base 20.

In the same way, the pivot 212b of the second disk storage portion 222 that has been movable in the directions indicated by the arrows 60A and 60B is also fixed at the predetermined position. Also, the second link mechanism fixes the second guide member 156, which has been movable in the directions indicated by the arrows 162C and 162D along the second guide groove 162, at its predetermined position. Consequently, the catching portion 222e of the second disk storage portion 222 that engages with the second guide member 156 has its position defined uniquely with respect to the traverse base 20.

Thus, by positioning the lower supporting base portion 212 with respect to the traverse base 20, the first and second guide members 155 and 156, moving along the first and second guide grooves 161 and 162, and the first and second disk storage portions 221 and 222 are positioned uniquely with respect to the traverse base 20 by the first and second link mechanisms described above. As a result, the axes of rotation of the first and second disk storage portions 221 and 222 and their angle of rotation are defined with respect to the traverse base 20 and the window 220w is opened fully.

Nevertheless, as the first and second biasing levers 151 and 152 apply biasing force to the first and second guide members 155 and 156 in the directions indicated by the arrows 151A and 152A, the first and second disk storage portions 221 and 222 are biased in the closing direction. Considering a possible variation in precision between the respective members and a possible misfit of the positioning pins, the window 220w sometimes could become slightly narrower and could not be opened fully.

For that reason, according to this preferred embodiment, the first and second guide members 155 and 156 are positioned directly with respect to the traverse base 20. More specifically, the length of the guide groove projections 155a and 156a of the first and second guide members 155 and 156 is made greater than the depth of the first and second guide grooves 155 and 156, thereby protruding the guide groove projections 155a and 156a from the cartridge holder 60 toward the traverse base 20 as shown in FIGS. 3A and 3B. The traverse base 20 has guide member positioning holes 25 and 26. If the cartridge holder 60 is turned and lowered with the first and second disk storage portions 221 and 222 opened, the guide groove projections 155a and 156a are inserted into the guide member positioning holes 25 and 26, respectively, as shown in FIG. 3B. As a result, no matter how much biasing force the first and second biasing levers 151 and 152 apply, the first and second guide members 155 and 156 are fixed and the first and second disk storage portions 221 and 222 can be kept opened just as intended.

As shown in FIG. 9, the catching portions 221e and 222e of the first and second disk storage portions 221 and 222 have regulating contact faces that contact with the first and second guide members 155 and 156 moving in the directions indicated by the arrows 161B and 162B along the first and second guide grooves 161 and 162. That is why when positioned with respect to the traverse base 20, the first and second guide members 155 and 156 contact with those regulating contact faces, thereby preventing the first and second disk storage portions 221 and 222 from rotating in the directions indicated by the arrows 221B and 222B anymore. As a result, the first and second disk storage portions 221 and 222 can be positioned just as intended without narrowing the window 220w.

Furthermore, by fitting the first and second guide members 155 and 156 into the guide member positioning holes 25 and 26 of the traverse base 20, respectively, the first and second disk storage portions 221 and 222 can be held by the first and second guide members 155 and 156. That is why even if the disk cartridge 200 is subjected to vibrations, shocks or any other disturbance, the window 220w can be kept fully opened just as intended.

The disk 10 is clamped between the disk mount 30a of the disk motor 30 and the clamper 50 (not shown) to get ready to rotate. In this case, the position regulating portions 213a, 213b and 213c of the lower supporting base portion 212 are also positioned with respect to the traverse base 20. As a result, the disk 10 can be provided with required clearance and is now ready to rotate.

Also, the positioning portion 65 of the cartridge holder 60 is supported by, and rotatable around, the shaft screws 81 and 82 with respect to the traverse base 20, and therefore, has been positioned accurately with respect to the traverse base 20.

Furthermore, the bottom of the lower supporting base portion 212 is supported on the bearing surfaces 21a and 22a of the cartridge positioning pins 21 and 22, while the bottom of the first and second disk storage portions 221 and 222 is supported on the bearing surfaces 23a and 24a of the fixing pins 23 and 24 on the traverse base 20. At this point in time, the portions of the first and second biasing levers 151 and 152 near the engaging grooves 151d and 152d, which have been in contact with the bottom of the first and second disk storage portions 221 and 222 and have guided the first and second disk storage portions 221 and 222 in the height direction, are no longer in contact with the bottom of the first and second disk storage portions 221 and 222.

That is to say, when a read/write operation is ready to be performed on the disk 10 (i.e., when the disk drive 500 is loaded with the disk cartridge 200), the disk cartridge 200 is supported on only the four bearing surfaces described above. For that reason, the disk cartridge 200 can be accurately positioned vertically with respect to the traverse base 20 and required clearance can be left just as intended for the disk 10. Optionally, springs (not shown) for pressing the disk cartridge 200 against the four bearing surfaces described above may be provided. In that case, the disk cartridge 200 can be positioned even more accurately.

Also, as shown in FIG. 9, when a read/write operation is performed on the disk 10, the unlocking portions 62a and 62b are out of contact with, and do not press, the openers/closers 231c and 232c of the first and second locking members 231 and 232. That is why when the disk drive 500 is loaded with the disk cartridge 200, the elastic portions 231d and 232d of the first and second locking members 231 and 232 do not deform elastically. Consequently, even if each of the first and second locking members 231 and 232 is an integral member made of resin, it is still possible to prevent the elastic portions 231d and 232d from creeping.

Furthermore, when the first and second disk storage portions 221 and 222 of the disk cartridge 200 are fully opened (i.e., when the disk drive 500 is loaded with the disk cartridge 200), the pivots 60a and 60b of the first and second biasing levers 151 and 152 are located outside of the projection area of the disk cartridge 200 that is defined perpendicularly to the axis of rotation of the disk 10 and near the guide walls 61a and 61b as shown in FIG. 9. That is why the members of the cartridge opening/closing mechanism 150 can be arranged efficiently without interfering with the disk cartridge 200 in the disk drive 500 and without expanding excessively in the width direction of the disk cartridge 200 loaded. As a result, a broad area can be secured for the window 220w, the optical head 40 can be designed more flexibly, and the thickness and overall size of the disk drive 500 can be cut down such that the disk drive 500 does not occupy too much space.

Figure 17:
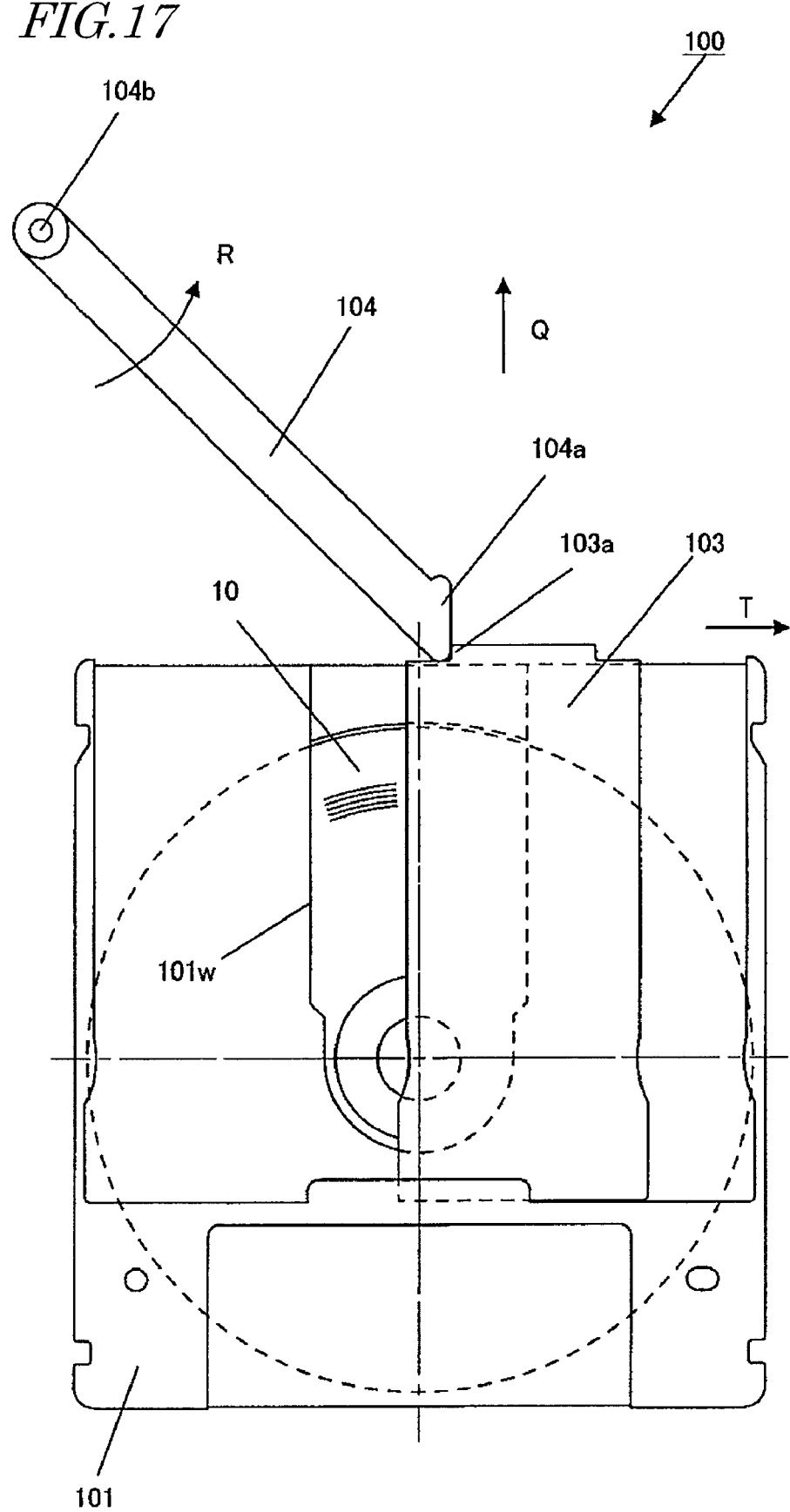
FIG. 17 is a plan view illustrating the general appearance of a conventional disk cartridge and one state thereof while the shutter of that cartridge is being opened or closed.

It should be noted that normally the disk drive 500 is designed so as to allow the disk cartridge 200 being inserted into the disk drive 500 a slightly greater stroke in the direction indicated by the arrow 60A (i.e., such that the disk cartridge 200 is inserted a little deeper than its loaded position). For that reason, if the disk 10 were centered only with the supporting base portion 101 as in the conventional disk cartridge 100 shown in FIG. 17, then the disk 10 being inserted would be positioned slightly deeper by that excessive stroke, thus possibly causing some variation in positioning accuracy depending on how deep the disk 10 has been inserted. However, according to this preferred embodiment, the cartridge holder 60 includes the positioning portion 65 for centering the disk 10 in the deep area of the disk drive 500. That is why even if the disk cartridge 200 has been inserted to varied depths in the direction indicated by the arrow 60A, the disk 10 can still be centered accurately with respect to the disk drive 500.

As described above, by inserting the disk cartridge 200 in the direction indicated by the arrow 60A such that the disk cartridge 200 changes its positions from that shown in FIG. 5 through that shown in FIG. 9, the window 220w of the disk cartridge 200 is fully opened and the cartridge opening/closing mechanism 150 finishes its opening operation.

Next, it will be described how the cartridge opening/closing mechanism 150 performs its closing operation as the disk cartridge 200 loaded in the disk drive 500 is gradually ejected. The cartridge opening/closing mechanism 150 performs its closing operation in reverse order compared to its opening operation described above. That is to say, the cartridge opening/closing mechanism 150 starts operating in the state shown in FIG. 9 and eventually performs the operation of ejecting the disk cartridge 200 in the direction indicated by the arrow 60B to assume the state shown in FIG. 5. As a result, the disk housing 220 is fully closed and the disk cartridge 200 is ejected out of the disk drive 500. Hereinafter, it will be described exactly how the cartridge opening/closing mechanism 150 performs its closing operation.

First, the operator turns the cartridge holder 60 in the direction indicated by the arrow 80A such that the disk cartridge 200 loaded as shown in FIG. 3B is ready to be inserted or ejected as shown in FIG. 3A. As a result, the disk cartridge 200 can move inside the cartridge holder 60 without interfering with the optical head 40 or the disk motor 30.

Also, as shown in FIG. 9, the cartridge positioning pins 21 and 22 are disengaged from the positioning holes 215a and 215b of the lower supporting base portion 212 and the first and second guide members 155 and 156 are disengaged from the guide member positioning holes 25 and 26 of the traverse base 20. As a result, the respective slider members that form the first and second link mechanisms described above (including the first and second guide members 155 and 156 and the pivots 212a and 212b of the first and second disk storage portions 221 and 222) are unlocked. Consequently, the disk cartridge 200 is now movable along the guide walls 61a and 61b of the cartridge holder 60 in the directions indicated by the arrows 60A and 60B. Also, due to the biasing force applied by the first and second biasing levers 151 and 152, the first and second guide members 155 and 156 start to move along the first and second guide grooves 161 and 162 in the directions indicated by the arrows 161C and 162C, respectively.

Conversely to the opening operation, as the first and second guide members 155 and 156 move along the first and second guide grooves 161 and 162 in the directions indicated by the arrows 161C and 162C, the first and second disk storage portions 221 and 222 rotate in the directions indicated by the arrows 221B and 222B, respectively, using the link mechanisms (including the first and second guide members 155 and 156 moving along the first and second guide grooves 161 and 162), thereby starting the operation of closing the disk housing 220.

As the first and second guide members 155 and 156 move from the positions shown in FIG. 9 along the first and second guide grooves 161 and 162 in the directions indicated by the arrows 161C and 162C, respectively, under the biasing force applied by the first and second biasing levers 151 and 152, the disk cartridge 200 is gradually ejected in the direction indicated by the arrow 60B as shown in FIG. 8 while being guided on the guide walls 61a and 61b due to the action of the link mechanisms that consist of the first and second guide members 155 and 156, moving along the first and second guide grooves 161 and 162, and the first and second disk storage portions 221 and 222.

In this case, as in the opening operation described above, the first and second disk storage portions 221 and 222 rotate in mutually opposite directions synchronously with each other via the engaging portions 221b and 222b. In addition, since the first and second guide members 155 and 156 and the first and second guide grooves 161 and 162 are arranged symmetrically with respect to the direction in which the disk cartridge 200 is ejected (i.e., the direction indicated by the arrow 60B), the disk cartridge 200 can move straight in the ejecting direction just as intended even during the ejecting operation.

Also, as in the opening operation described above, portions of the first and second biasing levers 151 and 152 near their engaging grooves 151d and 152d contact with, and support, the bottom of the first and second disk storage portions 221 and 222. In this manner, while the disk cartridge 200 is being ejected in the direction indicated by the arrow 60B, the first and second disk storage portions 221 and 222 can be guided in the height direction.

At this point in time, the first and second locking members 231 and 232 of the disk cartridge 200 are out of contact with the unlocking portions 62a and 62b. However, as the first and second disk storage portions 221 and 222 rotate in the directions indicated by the arrows 221B and 222B, the latching portions 221c and 222c of the first and second disk storage portions 221 and 222 contact with the catching lever portions 231b and 232b of the first and second locking members 231 and 232, thereby turning the first and second locking members 231 and 232 in the directions indicated by the arrows 231A and 232A.

Next, as the disk cartridge 200 is ejected further forward in the direction indicated by the arrow 60B than the position shown in FIG. 8 under the biasing force applied by the first and second biasing levers 151 and 152, the first and second guide members 155 and 156 continue to go in the directions indicated by the arrows 161C and 162C along the first and second guide grooves 161 and 162, thereby turning the first and second disk storage portions 221 and 222 in the directions indicated by the arrows 221B and 222B, respectively. As a result, the first and second guide members 155 and 156 are now located at the positions c1 and c2 shown in FIG. 4 and the window 220w is fully closed by the disk housing 220 as shown in FIG. 7.

At this point in time, the unlocking portions 62a and 62b are in contact with the openers/closers 231c and 232c of the first and second locking members 231 and 232, thus rotating the first and second locking members 231 and 232 in the directions indicated by the arrows 231A and 232A. That is why the first and second disk storage portions 221 and 222 are not locked but can rotate in the directions indicated by the arrows 221A and 222A, respectively.

The first and second biasing levers 151 and 152 apply biasing force to the first and second guide members 155 and 156 in the directions indicated by the arrows 151A and 152A, respectively. Thus, the first and second guide members 155 and 156 continue to move from the positions shown in FIG. 7 along the guide faces 161c and 162c of the first and second guide grooves 161 and 162 (see FIGS. 4A and 4B) in the direction indicated by the arrow 60B. As a result, the first and second guide members 155 and 156 gradually eject the disk cartridge 200 in the direction indicated by the arrow 60B while keeping in contact with the inner wall of the notches 221d and 222d of the first and second disk storage portions 221 and 222.

On stopping moving in the direction indicated by the arrow 60B by contacting with the guide faces 161a and 162a of the first and second guide grooves 161 and 162 at the positions a1 and a2 shown in FIG. 4, the first and second guide members 155 and 156 contact with the catching contact faces 221f and 222f of the notches 221d and 222d of the first and second disk storage portions 221 and 222. As a result, the disk cartridge 200 finishes being ejected in the direction indicated by the arrow 60B under the biasing force applied by the first and second biasing levers 153 and 154.

The contact of the first and second guide members 155 and 156 with the catching contact faces 221*f* and 222*f* prevents the disk cartridge 200 from popping out in the direction indicated by the arrow 60B and dropping out of the disk drive 500 due to the biasing force applied by the first and second biasing levers 151 and 152.

At this point in time, the openers/closers 231*c* and 232*c* of the first and second locking members 231 and 232 are out of contact with the unlocking portions 62*a* and 62*b*, respectively. Thus, under the elastic force applied by the elastic portions 231*d* and 232*d*, the first and second locking members 231 and 232 rotate in the directions indicated by the arrows 231B and 232B. As a result, the latching portions 221*c* and 222*c* of the first and second disk storage portions 221 and 222 get engaged with the catching lever portion 231*b* and 232*b* of the first and second locking members 231 and 232, respectively. Consequently, the first and second disk storage portions 221 and 222 are locked so as not to rotate in the directions indicated by the arrows 221A and 222A.

When the operator removes the disk cartridge 200 in the direction indicated by the arrow 60B in the state shown in FIG. 6, the first and second guide members 155 and 156 overcome the biasing force applied by the first and second biasing levers 151 and 152 in the directions indicated by the arrows 151A and 152A to move in the directions indicated by the arrows 161B and 162B to the positions b1 and b2 shown in FIG. 4 along the guide faces 161*a* and 162*a* of the first and second guide grooves 161 and 162. Consequently, the first and second guide members 155 and 156 move while sliding on the catching contact faces 221*f* and 222*f* of the first and second disk storage portions 221 and 222.

As a result, as shown in FIG. 5, the first and second guide members 155 and 156 are disengaged from the catching contact faces 221*f* and 222*f* of the first and second disk storage portions 221 and 222 to contact with the outer side surface of the first and second disk storage portions 221 and 222 instead. Consequently, the disk cartridge 200 is no longer held and can be removed from the cartridge holder 60.

Finally, when the operator removes the disk cartridge 200 in the direction indicated by the arrow 60B, the disk cartridge 200 is completely ejected from the cartridge holder 60 and the operation of closing the cartridge opening/closing mechanism 150 ends.

It should be noted that the operation of ejecting the disk cartridge 200 from the position shown in FIG. 7 to that shown in FIG. 6 depends on the balance between the biasing force applied by the first and second biasing levers 151 and 152 and the frictional force caused by the first and second guide members 155 and 156 on the inner wall of the notches 221*d* and 222*d* of the first and second disk storage portions 221 and 222. For that reason, if the frictional force is great, the ejection of the disk cartridge 200 in the direction indicated by the arrow 60B finishes at the stage shown in FIG. 7. Even so, the disk cartridge 200 is just ejected a little less forward from the cartridge holder 60. The operator can also remove the disk cartridge 200 from the cartridge holder 60 properly by sliding the disk cartridge 200 from the position shown in FIG. 6 to that shown in FIG. 5 in the direction indicated by the arrow 60B.

In the preferred embodiment described above, the cartridge opening/closing mechanism 150 consists of the first and second biasing levers 151 and 152 and the first and second guide members 155 and 156 that move along the first and second guide grooves 161 and 162, respectively. However, the first and second disk storage portions 221 and 222 of the disk cartridge 200 can rotate in mutually opposite directions synchronously with each other at the engaging portions 221*b* and 222*b*. That is why the first and second disk storage portions 221 and 222 could be opened or closed with only one biasing lever and only one guide member in theory.

In the disk cartridge 200, however, the disk housing 220 functioning as a housing needs to be rotated to make the window 220*w*. That is why the projection area of the disk cartridge 200 in the opened state becomes greater than that of the disk cartridge 200 in the closed state. For that reason, the guide walls 61*a* and 61*b* that contact with the outer side surface of the disk cartridge 200 to define the inserting and ejecting directions and positions should be located nowhere but near the front end of the disk drive 500 (i.e., closer to the holder opening 60*s*). Therefore, to insert or eject the disk cartridge 200 with good stability, the disk housing 220, which is front end of the disk cartridge 200, should be guided as will be described later.

Figure 10:
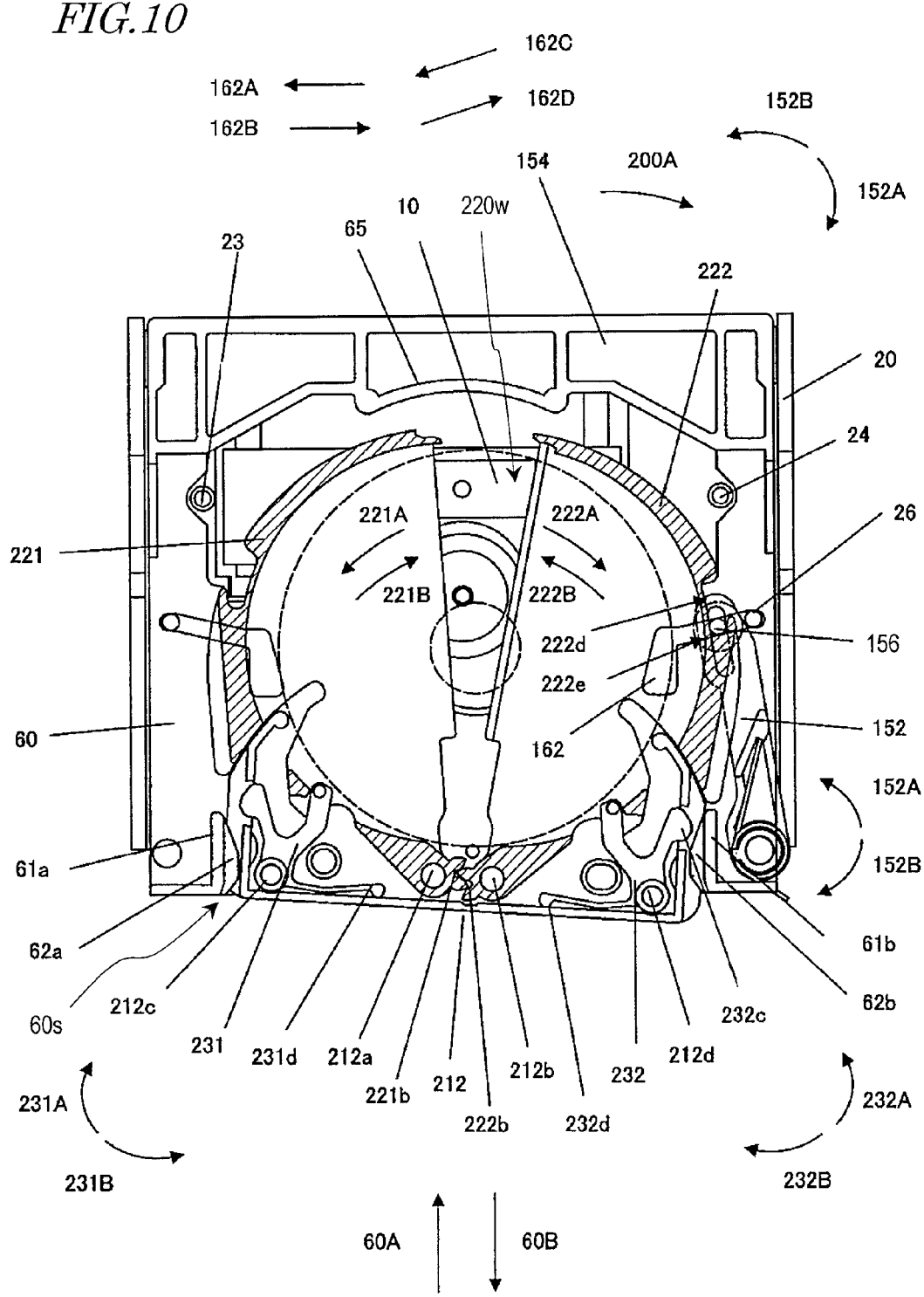
FIG. 10 is a plan view illustrating one state of a cartridge opening/closing mechanism with a different structure, which includes all members of the cartridge opening/closing mechanism shown in FIG. 1 but the first guide member and the first guide groove, during the opening operation.

FIG. 10 is a plan view illustrating how the disk drive would operate if the cartridge opening/closing mechanism 150 of the preferred embodiment described above consisted of only the second biasing lever 152 and the second guide member 156 with the first biasing lever 151 and the first guide member 155 removed.

As shown in FIG. 10, if the operator inserts the disk cartridge 200 through the holder opening 60*s* into the cartridge holder 60 in the direction indicated by the arrow 60A, the second guide member 156 soon gets engaged with the catching portion 222*e* of the second disk storage portion 222. Then, the second guide member 156 moves along the second guide groove 162 in the direction indicated by the arrow 162C, thus rotating the second biasing lever 152 in the direction indicated by the arrow 152B. As a result, the second disk storage portion 222 rotates in the direction indicated by the arrow 222A, and the first disk storage portion 221 also rotates in the direction indicated by the arrow 221A because the engaging portions 221*b* and 222*b* engage with each other.

In this case, however, the disk cartridge 200 is guided in the direction indicated by the arrow 60A just by the guide walls 61*a* and 61*b* of the cartridge holder 60. As for the disk housing 220 located deep inside the disk drive 500, only the second disk storage portion 222 is supported by the second guide member 156 that is moving along the second guide groove 162.

Thus, as the operator inserts the disk cartridge 200 in the direction indicated by the arrow 60A, the second disk storage portion 222 and the second guide member 156, moving along the second guide groove 162, form a link mechanism, which supports the second disk storage portion 222 firmly and turns the second disk storage portion 222 in the direction indicated by the arrow 222A. Meanwhile, the first disk storage portion 221 also rotates in the direction indicated by the arrow 221A because the first disk storage portion 221 is interlocked with the second disk storage portion 222 at the engaging portions 221*b* and 222*b*. However, since there is no first guide member 156 that moves along the first guide groove 161, the first disk storage portion 221 cannot be guided sufficiently. As a result, imbalanced load is placed on the first and second disk storage portions 221 and 222.

Consequently, the deeper the operator inserts the disk cartridge 200 in the direction indicated by the arrow 60A, the lighter the load placed on the first disk storage portion 221 of the disk cartridge 200. That is to say, the disk cartridge 200 will be inserted while tilting in the direction indicated by the arrow 200A. As a result, the disk cartridge 200 cannot be inserted properly and it is difficult to open the disk housing 220 as intended.

Suppose the disk cartridge 200 has been inserted properly. In that case, the second disk storage portion 222, engaged with the second guide member 156 that moves along the second guide groove 162, will be positioned properly with respect to the traverse base 20. On the other hand, the position of the first disk storage portion 221 in the opened state is determined only by the engaging state of the engaging portions 221b and 222b. As a result, the opening area of the window 220w would vary significantly. This is because as the engaging portion 221b is arranged near the pivot 212a, the error caused by slight misfit between the engaging portions 221b and 222b will be magnified greatly at the end of the first disk storage portion 221. Furthermore, while the disk housing is opened, the first disk storage portion 221 is held only by being interlocked with the second disk storage portion 222 at the engaging portions 221b and 222b, and therefore, will rotate easily in the direction indicated by the arrow 221A or 221B when subjected to some disturbance.

That is why if the disk housing 220 were opened and closed with only one biasing lever and only one guide member, then the operation of inserting or ejecting the disk cartridge 200 would lose stability and the opening area of the window 220w would vary significantly. For that reason, it is not preferable to provide only one biasing lever and only one guide member for the cartridge opening/closing mechanism 150 of the disk cartridge 200 that should open and close the window 220w using the first and second disk storage portions 221 and 222 that function not only as shutters but also as a housing.

Also, when the disk housing 220 has been rotated to make the window 220w in the disk cartridge 200, the disk cartridge 200 will have a greater projection area than in the closed state as shown in FIG. 9. That is why the guide width between the guide walls 61a and 61b arranged at the front end of the disk drive 500 (near the holder opening 60s) becomes narrower than the width of the disk cartridge 200 including the first and second disk storage portions in the opened state.

Therefore, even if the disk cartridge 200 could not be ejected to its predetermined position only by the biasing force applied by the first and second biasing levers 151 and 152 for some reason (e.g., some variation or failure of a member) and should be removed manually in the direction indicated by the arrow 60B by the operator, the first and second disk storage portions 221 and 222 that have been opened would contact with, and be closed by, the guide walls 61a and 61b while passing through the guide walls 61a and 61b at the holder opening. As a result, the disk cartridge 200 could also be removed with the first and second disk storage portions 221 and 222 closed.

Also, in the preferred embodiment described above, the first and second guide grooves 161 and 162, in which the first and second guide members 155 and 156 move, have guide faces 161b and 162b (see FIG. 4) that run substantially perpendicularly to the directions in which the disk cartridge 200 is inserted and ejected (i.e., the directions indicated by the arrows 60A and 60B).

Figure 11:
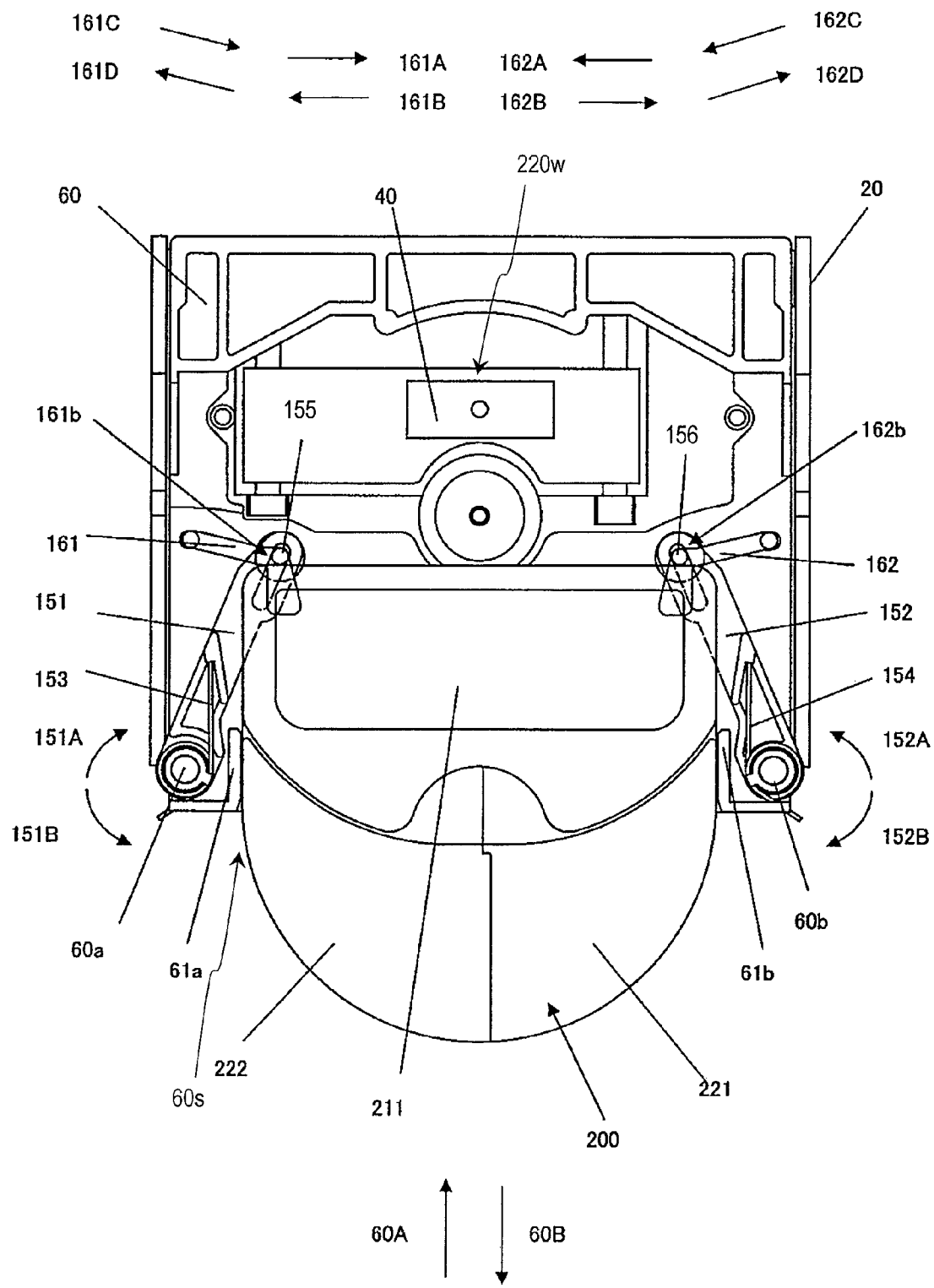
FIG. 11 is a plan view illustrating how the disk drive shown in FIG. 1 looks if the disk cartridge has been inserted wring end first.

That is why if the disk cartridge 200 is inserted wrong end first into the disk drive 500, the first and second guide members 155 and 156 will contact with the outer side surface of the disk cartridge 200 and move from their standby positions (i.e., the positions a1 and a2 shown in FIG. 4) in the direction indicated by the arrow 60A along the first and second guide grooves 161 and 162 to reach the guide faces 161b and 162b, respectively, as shown in FIG. 11.

Thereafter, even if the operator tried to further insert the disk cartridge 200, the first and second guide members 155 and 156 could not be moved in the directions indicated by the arrows 161B and 162B only with the force externally applied in the inserting direction (i.e., in the direction indicated by the arrow 60A). This is because the directions in which the first and second guide members 155 and 156 can move are defined by the guide faces 161b and 162b to be substantially perpendicular to the inserting direction (i.e., the direction indicated by the arrow 60A), or in the directions indicated by the arrows 161B and 162B, only if the disk cartridge 200 has been inserted properly. For that reason, the disk cartridge 200 that has been inserted wrong end first cannot be inserted no deeper into the disk drive 50 than the positions where the first and second guide members 155 and 156 contact with the guide faces 161b and 162b.

Consequently, if the first and second guide grooves 161 and 162 in which the first and second guide members 155 and 156 are supposed to move have the guide faces 161b and 162b that run substantially perpendicularly to the directions in which the disk cartridge 200 is inserted or ejected (i.e., the directions indicated by the arrows 60A and 60B), it is possible to prevent the disk cartridge 200, which has been inserted wrong end first by the operator, from being inserted erroneously farther than the guide grooves. In addition, since the first and second guide members 155 and 156 and the first and second guide grooves 161 and 162 also function as a mechanism for preventing the disk cartridge 200 from being inserted erroneously, the total number of the members that form the disk drive can be reduced.

In the preferred embodiment described above, the first and second guide members 155 and 156 contact with the catching contact faces 221f and 222f of the first and second disk storage portions 221 and 222, respectively, thereby preventing the disk cartridge 200 from popping out of the disk drive 500. However, the same effect can also be achieved even if just one of the two guide members 155 and 156 contacts with its associated catching contact face 221f or 222f.

Also, in the preferred embodiment described above, the disk cartridge 200 is positioned with the cartridge positioning pins 21 and 22 arranged on the traverse base 20. However, the disk cartridge 200 may also be positioned with a different pair of pins.

Furthermore, in the preferred embodiment described above, the first and second guide members 155 and 156 engage with the catching contact faces 221f and 222f of the first and second disk storage portions 221 and 222, thereby preventing the disk cartridge 200 being ejected from popping out. However, it is also possible to prevent the disk cartridge 200 from popping out by using either another preventing mechanism or a frictional member such as a rubber sheet.

Also, in the preferred embodiment described above, by tilting the cartridge holder 60 with respect to the traverse base 20, the disk cartridge 200 can be inserted or ejected without interfering with the disk motor 30 or the head 40. However, such interference may also be prevented by a different method. For example, the same effect can also be achieved even by lifting the cartridge holder 60 with respect to the traverse base 20 with these two members kept substantially parallel to each other or by tilting the cartridge holder 60 with respect to the traverse base 20.

Furthermore, in the preferred embodiment described above, the disk housing 220 is opened or closed by directly inserting or ejecting the disk cartridge 200 into/from the cartridge holder 60. However, the same effect can also be achieved by adopting a loading mechanism in which a drive source is newly provided, the disk cartridge 200 is put or held on a tray, a holder or any other transporting member, and that transporting member is inserted into, or ejected from, the disk drive.

Also, in the preferred embodiment described above, the positioning portion 65 is provided for the cartridge holder 60. But the same effect can also be achieved even by providing the positioning portion 65 for the traverse base 20.

Furthermore, in the preferred embodiment described above, portions of the first and second biasing levers 151 and 152 near their engaging grooves 151d and 152d contact with the bottom of the first and second disk storage portions 221 and 222 such that the first and second disk storage portions 221 and 222 can be guided in the height direction while the disk cartridge 200 is being inserted or ejected. However, the same effect can also be achieved even if the first and second disk storage portions 221 and 222 are guided in the height direction by the first and second guide members 155 and 156.

Furthermore, in the preferred embodiment described above, the first and second guide grooves 161 and 162 to guide the first and second guide members 155 and 156 consist of a number of almost straight guide faces as shown in FIG. 4. Alternatively, the guide faces may also form a straight guide groove that intersects with the disk cartridge inserting and ejecting directions at right angles, a straight guide groove that defines a predetermined angle with respect to the disk cartridge inserting and ejecting directions, or even a curved guide groove.

Also, in the preferred embodiment described above, the first and second guide members 155 and 156 are biased by the first and second biasing levers 151 and 152. However, the same effect can also be achieved even by adopting a structure in which the first and second guide members 155 and 156 are directly biased by an extension spring or torsion coil spring.

Furthermore, in the preferred embodiment described above, the first and second guide members 155 and 156 are positioned with the guide member positioning holes 25 and 26 that have been cut through the traverse base 20, thereby maintaining a sufficiently broad area for the window 220w. As described above, the opening area of the window 220w is determined by one link mechanism consisting of the first guide member 155, moving along the first guide groove 161, and the first disk storage portion 221 and the other link mechanism consisting of the second guide member 156, moving along the second guide groove 162, and the second disk storage portion 222. Optionally, in view of possible variation in precision between respective members and possible misfit of the cartridge positioning pins 21 and 22, this area may be defined to be large enough to provide a sufficient area even if the window has shrunk to its smallest size. In that case, positioning with the guide member positioning holes 25 and 26 may be omitted or a structure in which the positioning holes are expanded so much as to be relief holes may be adopted.

As described above, according to the present invention, when a disk cartridge is inserted into the disk drive of the present invention, the gap between the first and second guide members is narrower than the gap between the pair of guide walls. That is why the first and second guide members can contact and engage firmly with the disk cartridge being inserted. In addition, the first and second guide members move along the first and second guide grooves such that the gap between the first and second guide members will become broader than the gap between the pair of guide walls when the disk drive has been loaded with the disk cartridge. For that reason, when the disk storage portions are opened, a big window can be made with the shutter and housing portions sticking out of the projection area of the disk cartridge when the disk storage portions are closed. Consequently, this disk drive is compatible with a disk cartridge that has a big head access window for its small overall size.

The disk drive of the present invention can be used particularly effectively for a disk cartridge with first and second disk storage portions that function not only as shutters but also as a housing.

A disk drive according to the present invention can be used effectively to operate a disk cartridge that opens and closes a window with disk storage portions functioning not only as shutters but also as a housing. Specifically, in the disk drive of the present invention, first and second guide members that engage with their associated notches of first and second disk storage portions are arranged symmetrically to each other with respect to a plane that is defined parallel to the direction in which the disk cartridge is inserted or ejected and that includes the axis of rotation of the disk. The guide members are respectively moved along first and second guide grooves synchronously with the insertion or ejection of the disk cartridge, thereby opening or closing the first and second disk storage portions. In particular, by arranging one link mechanism formed by the first guide member moving along the first guide groove and the first disk storage portion and another link mechanism formed by the second guide member moving along the second guide groove and the second disk storage portion symmetrically to each other, it is possible to guarantee that the disk cartridge being inserted or ejected can go straight all the way. In addition, the first and second disk storage portions can be firmly held by the first and second guide members, and therefore, the disk cartridge can still be inserted or ejected with good stability even when subjected to some disturbance such as vibrations or shocks.

Furthermore, when the disk drive is loaded with the disk cartridge, the pivots of the first and second biasing levers of the cartridge opening/closing mechanism are located outside of the projection area of the disk cartridge that is defined perpendicularly to the axis of rotation of the disk and near a pair of guide walls. That is why the members of the cartridge opening/closing mechanism can be arranged efficiently without interfering with the disk cartridge in the disk drive and without expanding excessively in the width direction of the disk cartridge loaded. As a result, a broad opening area can be secured for the window of the disk cartridge, the optical head can be designed more flexibly, and the thickness and overall size of the disk drive can be cut down such that the disk drive does not occupy too much space.

On top of that, a first link mechanism is formed by the first guide member moving along the first guide groove and the first disk storage portion and a second link mechanism is formed by the second guide member moving along the second guide groove and the second disk storage portion. That is why when the first and second disk storage portions open and are fixed with a pair of positioning pins on a traverse base, the rotation of the first and second disk storage portions and the movement of the first and second guide members along the first and second guide grooves are restricted. Thus, by positioning the lower supporting base portion with respect to the traverse base, all members including the first and second guide members are positioned uniquely by the first and second link mechanisms, and eventually, the first and second disk storage portions automatically change their states into the opened state. As a result, positioning can get done with a reduced number of positioning portions and yet the reliability of positioning can be improved. In addition, by directly positioning the first and second guide members with positioning holes that have been cut through the base, the first and second disk storage portions in the opened state can be positioned even more accurately.

Moreover, the first and second guide members fit into the positioning holes that have been cut through the traverse base, thereby holding the first and second disk storage portions on the first and second guide members. As a result, even when the disk drive is subjected to some disturbance such as vibrations or shocks, the window can still keep sufficiently broad area and it is possible to prevent the disk cartridge from colliding against the head or disk motor.

Furthermore, by providing not only supporting portions to contact with the respective bottoms of the first and second disk storage portions that function as a housing but also a bearing surface to contact with the bottom of the supporting base member for the traverse base, the first and second disk storage portions can be positioned vertically and minimum required clearance can be allowed to rotate the disk. As a result, the disk drive can have a reduced thickness, the first and second disk storage portions can be held firmly when opened and the steadiness of the disk cartridge can be increased in its opened state.

What is more, the first and second guide members are biased by first and second biasing levers, to which biasing springs that apply biasing force to the first and second disk storage portions in the closing direction are attached. Thus, when the operator performs the operation of inserting the disk cartridge, the first and second disk storage portions can be opened while being given appropriate operation load. On the other hand, in performing the ejection operation, the first and second guide members can be moved along the first and second guide grooves, thereby ejecting the disk cartridge automatically and closing the first and second disk storage portions just as intended. Consequently, the operability of the disk drive while the disk cartridge is being inserted or ejected into/from the drive (i.e., the operability at the man-machine interface) can be controlled solely according to the biasing force applied by the biasing springs. In addition, there is no need to provide any drive source or drive mechanism to get the disk cartridge insertion/ejection operation done. Consequently, the number of members required can be reduced significantly and the weight and the cost of the disk drive can also be cut down.

Besides, when the first and second disk storage portions are fully closed, the first and second guide members contact with the respective catching contact faces of the notches of the first and second disk storage portions in the disk cartridge. Thus, it is possible to prevent the disk cartridge being ejected from popping out of the disk drive due to the excessive biasing force applied by the first and second biasing levers. As a result, the disk cartridge can be removed from the disk drive safely and would not drop by itself accidentally.

What is more, the width of the holder opening, through which the disk cartridge is inserted, is set substantially equal to the minimum width of the projection area of the disk cartridge that is defined perpendicularly to the axis of rotation of the disk. In that case, even if the disk cartridge is not ejected automatically by the first and second biasing levers for some reason, the first and second disk storage portions that have been opened contact with, and are closed by, the guide walls while passing through the holder opening. Thus, the disk cartridge can also be removed with the first and second disk storage portions closed. As a result, even if the disk cartridge cannot be ejected automatically, the disk cartridge can still be ejected manually without scratching the disk in the disk cartridge.

On top of that, by arranging unlocking portions on the guide walls of the holder opening, through which the disk cartridge is inserted, the unlocking portions can be positioned more accurately with the profile of the disk cartridge taken into consideration. Therefore, the locking members of the disk cartridge can be unlocked by the unlocking portions at the best timing after the disk cartridge has been inserted and before the disk cartridge is ejected. As a result, even if the disk cartridge should be ejected manually as described above, the first and second disk storage portions can be locked just as intended without breaking the locking members.

Also, when the first and second disk storage portions are opened after the disk cartridge has been inserted into the cartridge holder, the locking members of the disk cartridge are not kept pressed, thus preventing the locking members made of resin from creeping.

Furthermore, by arranging the cartridge opening/closing mechanism, consisting of the first and second guide members, the first and second guide grooves, and the first and second biasing levers, closer to the holder opening of the disk drive (i.e., closer to the front end of the drive), the space left for the head and the area in which the first and second guide members are supposed to rotate do not overlap with each other. As a result, the head can be designed more flexibly. In addition, since the head does not overlap with the first and second guide members or the first and second biasing levers, the thickness of the disk drive can be reduced.

Also, the first and second guide grooves, in which the first and second guide members move, have guide faces that run perpendicularly to the disk cartridge inserting/ejecting directions. Thus, if the disk cartridge were inserted wrong end first by mistake, then the force that would have moved the first and second guide members along the guide faces would not be produced, thus preventing the operator from inserting the disk cartridge no deeper than the guide grooves. That is to say, the guide faces of the guide grooves function as a mechanism for preventing the disk cartridge from being inserted erroneously. Consequently, since the first and second guide members and the first and second guide grooves can together function as an erroneous insertion preventing mechanism, the number of members that form the disk drive can be reduced significantly compared to the situation where an erroneous insertion preventing mechanism should be provided separately.

Furthermore, by designing the first and second guide grooves such that the standby positions of the first and second guide members before the disk cartridge is inserted are located closer to the holder opening of the disk drive (i.e., closer to the front end of the drive) than the positions of the first and second guide members when the disk drive is loaded with the disk cartridge, the disk cartridge is ejected with a greater amount. As a result, the disk cartridge can be removed from the disk drive much more easily.

Optionally, if the first and second guide grooves in which the first and second guide members move has their shapes (i.e., guiding profiles) changed, the opening/closing rates, timings and operation loads of the first and second disk storage portions can be adjusted while the disk cartridge is being inserted or ejected. As a result, a disk drive, of which the operability or operating stability has been adapted to its applications, can be provided.

Also, while the disk cartridge has not been inserted yet, the first and second guide members fit into the guide member regulating holes of the base, thereby regulating the position of the cartridge opening/closing mechanism. Consequently, the biasing levers and other members would not rattle even when the disk drive is subjected to some disturbance such as vibrations or shocks while being carried. In addition, it is also possible to prevent those members from being damaged due to the impact produced by dropping.

The disk drive of the present invention can be used effectively to read and/or write information from/on a disk housed in a disk cartridge that is designed to perform the read/write operations by any of various methods including optical, magneto-optical and magnetic ones. Among other things, the present invention is particularly effectively applicable to a disk drive to be loaded with a disk cartridge that houses a disk of a small diameter.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2007-011002 filed on Jan. 22, 2007 and No. 2008-005378 filed on Jan. 15, 2008, the entire contents of which are hereby incorporated by reference.

What is claimed is:

1. A disk drive to be loaded with a disk cartridge that houses a disk therein, the drive comprising:
   a cartridge holder for holding the disk cartridge, the holder having a holder opening, through which the disk cartridge is inserted from outside of the drive into the cartridge holder and ejected out of the cartridge holder;
   a pair of guide walls, which is arranged in the vicinity of the holder opening of the cartridge holder to define a direction in which the disk cartridge is supposed to be inserted;
   a disk motor for rotating the disk that has been mounted thereon;
   a head for reading and/or writing information from/on the disk;
   a base for supporting the head and the disk motor thereon;
   first and second guide grooves, which have been cut through the cartridge holder; and
   first and second guide members, which are movable along the first and second guide grooves, respectively, and which engage with respective portions of the disk cartridge,
   wherein the first and second guide members move along the first and second guide grooves, respectively, and engage with the disk cartridge so as to leave a gap that is narrower than a gap between the guide walls when the disk cartridge is inserted but to leave a gap that is broader than the gap between the guide walls when the drive gets loaded with the disk cartridge, thereby opening a window in the disk cartridge so as to allow the head to access the disk and also allow the disk motor to mount the disk.

2. The disk drive of claim 1, wherein in the cartridge holder, the first and second guide grooves are arranged symmetrically to each other with respect to a plane that is defined parallel to the direction in which the disk cartridge is inserted or ejected and that includes the axis of rotation of the disk.

3. The disk drive of claim 2, wherein at least one of the first and second guide grooves is partially defined by a guide face that intersects at right angles with the direction in which the disk cartridge is inserted or ejected.

4. The disk drive of claim 3, wherein positions where the first and second guide members start engaging with the disk cartridge being inserted are closer to the holder opening than their positions when the drive is loaded with the disk cartridge.

5. The disk drive of claim 4, wherein the disk cartridge includes:
   first and second disk storage portions, each of which has a space to house the disk partially and which house the disk entirely when joined together; and
   a supporting base member for supporting the first and second disk storage portions so as to allow the first and second disk storage portions to turn around their respective pivots,
   wherein the first and second guide members interlock with the first and second disk storage portions, respectively, thereby turning the first and the second disk storage portions so as to open a window in the disk cartridge being inserted.

6. The disk drive of claim 5, wherein each of the first and second disk storage portions of the disk cartridge includes:
   a notch, with which an associated one of the first and second guide members engages rotatably; and
   an engaging portion,
   wherein the engaging portions of the first and second disk storage portions engage with each other such that the first and second disk storage portions turn around the pivots in mutually opposite directions synchronously with each other.

7. The disk drive of claim 6, wherein a first link mechanism is formed by the first guide member that moves along the first guide groove when the disk cartridge is inserted or ejected, the notch of the first disk storage portion with which the first guide member engages rotatably, the first disk storage portion, and the pivot of the first disk storage portion, and
   wherein a second link mechanism is formed by the second guide member that moves along the second guide groove when the disk cartridge is inserted or ejected, the notch of the second disk storage portion with which the second guide member engages rotatably, the second disk storage portion, and the pivot of the second disk storage portion, and
   wherein as the first and second disk storage portions turn around their pivots in mutually opposite directions synchronously with each other, the first and second link mechanisms get the disk cartridge inserted in the right direction, thereby positioning the disk cartridge being inserted or ejected just as intended.

8. The disk drive of claim 7, wherein the pair of guide walls is arranged only in the vicinity of the holder opening.

9. The disk drive of claim 8, further comprising a positioning portion to contact with the outer edge of the disk when the disk cartridge is loaded,
   wherein the positioning portion and the disk contact with each other, thereby positioning the center of the disk with respect to the disk motor.

10. The disk drive of claim 9, wherein the positioning portion forms part of the cartridge holder.

11. The disk drive of claim 10, wherein the positioning portion forms part of the base.

12. The disk drive of claim 10, wherein the first and second guide members have a guide face that contacts with the bottom of the first and second disk storage portions while the disk cartridge is being inserted or ejected.

* * * * *